US009241166B2

(12) United States Patent
Konda et al.

(10) Patent No.: US 9,241,166 B2
(45) Date of Patent: Jan. 19, 2016

(54) TECHNIQUE FOR ADAPTING DEVICE TASKS BASED ON THE AVAILABLE DEVICE RESOURCES

(75) Inventors: Rupesh Kumar Konda, San Diego, CA (US); Seyfullah H. Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 13/493,977

(22) Filed: Jun. 11, 2012

(65) Prior Publication Data

US 2013/0329777 A1    Dec. 12, 2013

(51) Int. Cl.
*H04N 19/156* (2014.01)
*H04N 19/164* (2014.01)
*H04L 29/08* (2006.01)

(52) U.S. Cl.
CPC .............. *H04N 19/156* (2014.11); *H04L 67/04* (2013.01); *H04N 19/164* (2014.11)

(58) Field of Classification Search
CPC .............................. H04L 67/04; H04N 19/156
USPC ........................................................ 375/240
See application file for complete search history.

(56) References Cited

U.S. PATENT DOCUMENTS

| 6,999,432 | B2 | 2/2006 | Zhang et al. | |
| 7,076,556 | B1 * | 7/2006 | Brock et al. | 709/228 |
| 8,159,520 | B1 * | 4/2012 | Dhanoa et al. | 348/14.02 |
| 2006/0104348 | A1 | 5/2006 | Chen et al. | |
| 2006/0282737 | A1 * | 12/2006 | Shi et al. | 714/746 |
| 2008/0152003 | A1 | 6/2008 | Oguz | |
| 2010/0316012 | A1 | 12/2010 | Stanwood et al. | |
| 2012/0042050 | A1 | 2/2012 | Chen et al. | |

FOREIGN PATENT DOCUMENTS

WO    2011023096 A1    3/2011

OTHER PUBLICATIONS

Khan S., et al., "Application—Driven Cross—Layer Optimization for Video Streaming Over Wireless Networks" Cross Layer Design, IEEE Communications Magazine, pp. 122-130 (Jan. 2006).
Lee K.B., "Design and Implementation of H.264/AVC Decoder", of Fa-Long Luo (Ed.), Mobile Multimedia Broadcasting Standards: Technology and Practice, Springer, Data from Chapter 18, pp. 509-535 (2009).

(Continued)

*Primary Examiner* — Geepy Pe
*Assistant Examiner* — Berteau Joisil

(57) ABSTRACT

Methods, systems and devices are provided for efficiently receiving and displaying content in a mobile computing device. The computing device's reception and decoding operations are adjusted to match the capabilities of available device resources and/or to meet battery consumption needs/requirements. Higher level components (e.g., application layer components) selectively pull data from lower-level components (e.g., physical-layer or adaptation-layer components). The quality of video displayed is intelligently balanced against the amount of resources available, and a subset of the video data sufficient to display the content is pulled from the lower layer, providing users with an optimal balance between content quality and power consumption.

113 Claims, 12 Drawing Sheets

(56) References Cited

OTHER PUBLICATIONS

International Search Report and Written Opinion—PCT/US2013/043871—ISA/EPO—Nov. 21, 2013.

Oyman O., et al., "Quality of Experience for HTTP Adaptive Streaming Services", IEEE Communications Magazine, IEEE Service Center, Piscataway, US, vol. 50, No. 4, Apr. 1, 2012, pp. 20-27, XP011440704, ISSN: 0163-6804, DOI:10.1109/MCOM.2012.6178830 pp. 20-27.

* cited by examiner

TECHNIQUE FOR ADAPTING DEVICE TASKS BASED ON THE AVAILABLE DEVICE RESOURCES

BACKGROUND

Wireless communication technologies have seen explosive growth over the past few years. Wireless service providers now offer their customers an array of services, and provide users with unprecedented levels of access to information, resources, and communications. To keep pace with these service enhancements, mobile electronic devices (e.g., cellular phones, tablets, laptops, etc.) have become more powerful and complex than ever. Mobile electronic devices now commonly include multiple processors, system-on-chips (SoCs) and other resources (e.g., power rails, memory, etc.) that allow mobile device users to execute complex and power intensive software applications (e.g., video processing software) on their mobile devices. These greatly deplete the mobile device's battery life, and the efficient utilization of mobile device resources is becoming an ever more important design consideration.

SUMMARY

The various embodiments provide methods, systems and devices for receiving and displaying video content on a lightweight portable receiver device in a manner that enables improving battery life or accommodating current processor availability or workload.

Various embodiments include methods of enhancing user experience and performance in a mobile device having a physical layer component and an application layer component by determining resource availability in the application layer component, determining an acceptable level of quality that balances resource availability and presentation quality in the application layer component, receiving content in the physical layer component, and the application layer component pulling from the physical layer component a subset of content data, the subset being sufficient to provide the determined level of quality.

In an embodiment, determining an acceptable level of quality that balances resource availability and presentation quality may include the application layer component communicating with an operating system of the mobile device through a programming interface. In a further embodiment, determining an acceptable level of quality that balances resource availability and presentation quality in the application layer component may include determining whether the mobile device is connected to a steady power source. In a further embodiment, determining an acceptable level of quality that balances resource availability and presentation quality in the application layer component may include monitoring battery power. In a further embodiment, receiving content in the physical layer component may include receiving compressed video frames in the physical layer component.

In a further embodiment, pulling from the physical layer component a subset of content data sufficient to provide the determined level of quality may include pulling content data based on the determined resource availability. In a further embodiment, pulling content data based on the determined resource availability may include determining resource availability based on at least one of instantaneous processor utilization, average processor utilization, remaining battery power of the mobile device, instantaneous power consumption, average power consumption, idle processor cycles, available system memory, and available system memory bandwidth. In a further embodiment, pulling from the physical layer component a subset of content data sufficient to provide the determined level of quality may include the physical layer component declining to receive one or more of non-reference video frames and enhancement layer video frames in a video data stream.

In a further embodiment, the method may include changing a decode frame rate by not decoding at least one received non-reference video frame. In a further embodiment, pulling from the physical layer component a subset of content data sufficient to provide the determined level of quality may include not pulling at least one or more of reference video frames and any non-reference video frames following the reference frames in presentation order until an earliest scene change instant when the earliest scene change instant is detected to occur sooner than a threshold duration. In a further embodiment, pulling from the physical layer component a subset of content data sufficient to provide the determined level of quality may include the physical layer component declining to receive at least one or more of reference video frames and any non-reference video frames following the reference frames in presentation order until an earliest scene change is detected to occur sooner than a threshold duration. In a further embodiment, the method may include changing a render frame rate by not rendering at least one or more video frames after decoding.

In a further embodiment, pulling from the physical layer component a subset of content data sufficient to provide the determined level of quality may include one of simplifying or skipping deblocking of non-reference frames, and simplifying or skipping deblocking of reference frames when a full screen refresh is detected to occur sooner than a threshold duration, and In an embodiment, the method may include substituting a default higher complexity and higher performance spatial resizing algorithm used for display with a lower complexity algorithm. In a further embodiment, pulling from the physical layer component a subset of content data sufficient to provide the determined level of quality may include powering off a radio module of the mobile device during transmission of video frames not required such that the physical layer component does not receive these video frames.

In a further embodiment, determining an acceptable level of quality that balances resource availability and presentation quality in the application layer component may include collecting data and reporting utilization and availability information to one or more application layer components. In a further embodiment, the method may include transitioning from a higher quality to a lower quality when resources are scarce, and transitioning from the lower quality back to the higher quality when resources are no longer scarce.

Various embodiments may include methods of enhancing user experience and mobile device performance in a mobile device having an application layer component by determining mobile device resource availability in the application layer component, determining an acceptable level of quality that balances resource availability and presentation quality in the application layer component, receiving content in a dynamic adaptive video streaming session of the application layer component from a streaming server, and the application layer component pulling from the streaming server a subset of content data, the subset being sufficient to provide the determined level of quality.

In an embodiment, determining an acceptable level of quality that balances resource availability and presentation quality in the application layer component may include the application layer component communicating with an operating system of the mobile device through a programming interface. In a further embodiment, receiving content from a streaming server may include pulling and receiving compressed video frames. In a further embodiment, determining an acceptable level of quality that balances resource availability and presentation quality in the application layer component may include monitoring battery power. In a further embodiment, determining an acceptable level of quality that balances resource availability and presentation quality in the application layer component may include determining whether the mobile device is connected to a steady power source.

In a further embodiment, pulling from the streaming server a subset of content data sufficient to provide the determined level of quality may include pulling content data based on an availability of device resources. In a further embodiment, pulling content data based on an availability of device resources may include pulling content data based on at least one of instantaneous processor utilization, average processor utilization, remaining battery power of the mobile device, instantaneous power consumption, average power consumption, idle processor cycles, available system memory and available system memory bandwidth. In a further embodiment, pulling from the streaming server a subset of content data sufficient to provide the determined level of quality may include pulling a set of compressed video frames having an altered level of quality in at least one of a frame rate, a frame spatial resolution, and a frame compression quality. In a further embodiment, the method may include changing a decode frame rate by not decoding at least one received non-reference video frame.

In a further embodiment, pulling a subset of content data sufficient to provide the determined level of quality may include not pulling at least one of a reference video frame and any non-reference video frames following the reference video frame in presentation order until an earliest scene change instant when the earliest scene change instant is detected to occur sooner than a threshold duration. In a further embodiment, pulling from the streaming server a subset of content data sufficient to provide the determined level of quality may include not decoding at least one or more of reference video frames and any non-reference video frames following them in presentation order until an earliest scene change instant when the earliest scene change instant is detected to occur sooner than a threshold duration. In a further embodiment, the method may include changing a render frame rate by not rendering at least one or more video frames after decoding.

In a further embodiment, pulling from the streaming server a subset of content data sufficient to provide the determined level of quality may include one of simplifying or skipping deblocking of non-reference frames, and simplifying or skipping deblocking of reference frames when a full screen refresh is detected to occur sooner than a threshold duration. In a further embodiment, the method may include. substituting a default higher complexity and higher performance spatial resizing algorithm used for display with a lower complexity algorithm. In a further embodiment, pulling from the streaming server a subset of content data sufficient to provide the determined level of quality may include collecting data and reporting utilization and availability information to one or more application layer components by a system wide resource monitoring agent. In a further embodiment, the method may include transitioning from a higher quality to a lower quality when resources are scarce, and transitioning from the lower quality back to the higher quality when resources are no longer scarce.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
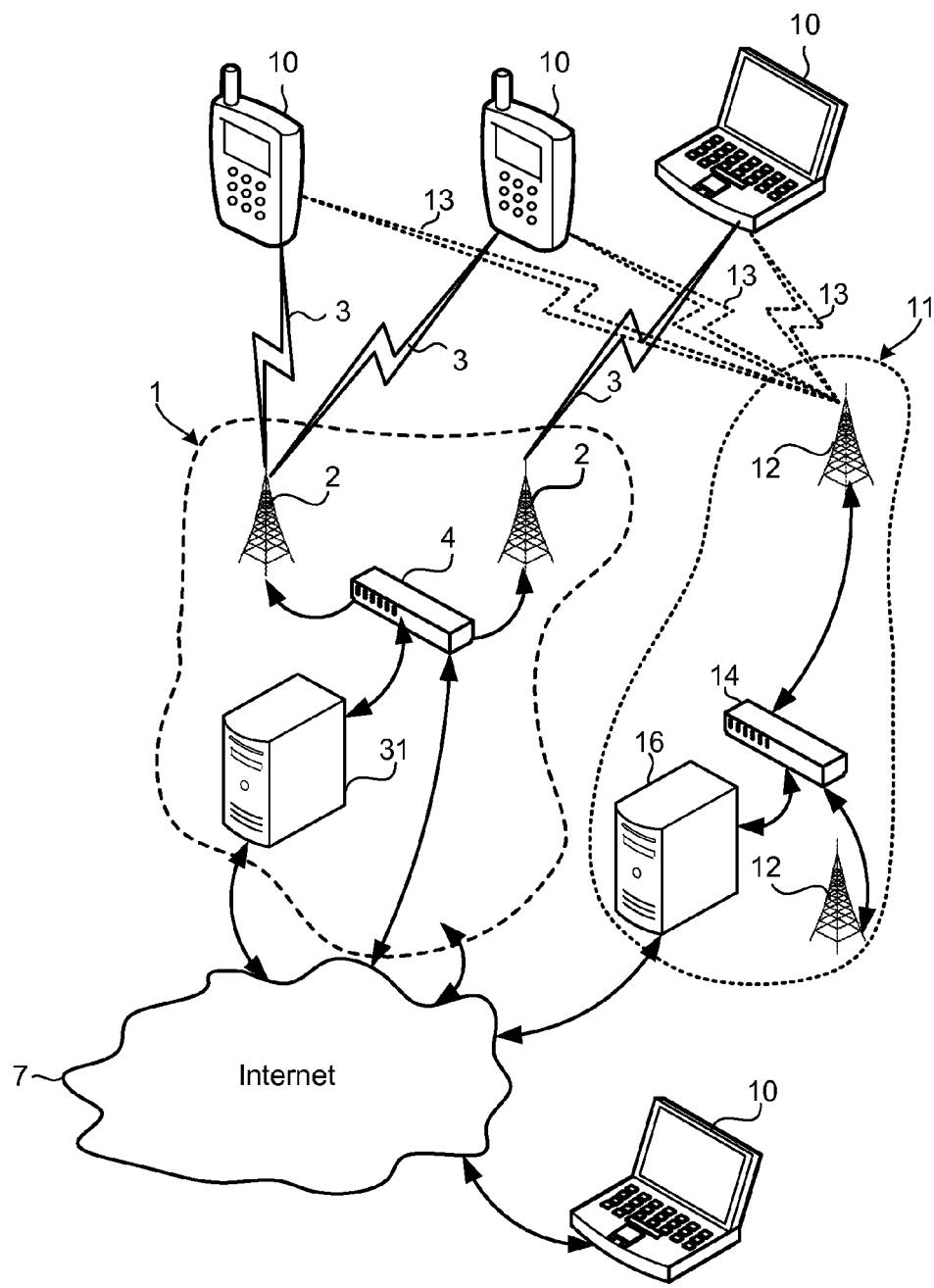
FIG. 1 is a communication system block diagram illustrating a mobile multimedia communication system suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "mobile computing device" and "receiver device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a programmable processor and circuitry for receiving and processing multimedia.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and other similar electronic devices that include a programmable processor and circuitry for wirelessly sending or receiving information.

The word "broadcast" is used herein to mean the transmission of data (files, information packets, television programming, etc.) so that it can be received by a large number of receiving devices simultaneously, and includes multicast.

A number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Each of these broadcast formats involves a broadcast communication channel. Additionally, multimedia services may be delivered directly to individual mobile devices (i.e., unicast) via cellular and/or wireless communication services and technologies, which may include third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these cellular/wireless technologies involves, for example, the transmission and reception of voice, data, signaling and/or content messages.

It should be understood that any references to terminology and/or technical details related to an individual standard or technology are for illustrative purposes only, and are not intended to limit the scope of the claims to a particular communication system or technology unless specifically recited in the claim language.

The various embodiments provide methods, systems and devices for efficiently receiving and displaying multimedia content (e.g., audio-video streams, etc.) on computing devices, particularly mobile computing devices.

The various embodiments enable an application layer component (e.g. a media player application) to selectively pull a subset of content data from a physical layer component based on the availability of device resources (e.g., processor availability, battery reserve, etc.). The approach implemented in the various embodiments is in effect the opposite to what is used in conventional multimedia players in which a physical layer component pushes all of the received data to the application layer component, which must then process all of that data even if some of it is not used. The conventional approach of pushing all received data to the application layer requires more power consumption since the data must be transferred through the internal data channels (which consume power) and stored in buffers accessible by the application (which also consumes power). Since the various embodiments pull a subset of the data that will be used by the media player application, power and processor resources associated with passing and buffering data are consumed only by the data actually used by the application; the rest of the received data (i.e., received data which is not pulled by the application) is simply ignored or written over at the physical layer. Thus, the various embodiments enable the media player application to change video stream processing (reception, decoding and rendering) rates based on the availability of resources, with the decision on what and how to process being made by the application layer component (e.g., a media player) in a manner that balances the user's experience against power savings and/or accommodates the processor's workload.

Generally, a receiving and displaying content on a computing device requires the execution of software applications (e.g., media players) that consume a significant amount of essential device resources (CPU operations, battery power, memory, etc.). Such software applications typically execute multiple power and resource intensive multimedia tasks, which may greatly reduce the battery life and/or otherwise occupy/consume/deplete mobile device resources. For example, a typical mobile device processor may operate at 5% of its capacity and consume around 10 milliamp (mA) of current while in an idle state, but operate at about 60% of its capacity and consume around 400 mA of current during the execution of a multimedia task. In addition, the execution of multimedia tasks may place similar demands on other device resources and components, such as voltage rails, graphics processing units (GPUs), and memories. This is due, in part, to the large amount of digital information that must be received, error-corrected, communicated to the rendering application, and processed by that application within the mobile device. In addition, due to the nature of multimedia content, the reception and processing must be accomplished within strict time and synchronization requirements in order to provide a satisfying user experience—users have little patience for dropped frames and audio out of synchronization with video. Further, such demands on the quality of rendered media must be met under all situations in which the mobile device may operate.

There are currently a number of readily available audio and video compression techniques (e.g., moving picture experts group "MPEG" compression) that reduce the spatial and temporal redundancy of the video (and thus reduce the amount of information that must be communicated). Regardless of the efficiency of the compression methods, however, the reception and rendering of multimedia content requires significant energy and processor resources in a receiver device. The process of receiving symbols via a radio frequency receiver, buffering received signals, and performing error correction and decoding of symbols just to receive the compressed data consumes significant power and processing resources at the physical layer. Then, in order to render the multimedia content, the received compressed multimedia data must be processed through several pre-processing and post-processing operations in order to properly decode the data into a format that can be displayed and played through a speaker. These pre-processing and post processing operations consume a significant amount of power, CPU resources, and memory. Thus, processing methods that reduce the amount of resources or processing performed as part of the pre-processing and post processing operations may significantly increase battery life and improve the overall user experience.

The various embodiments enable the mobile device processor to adjust the reception and decoding operations to match the capabilities of available device resources and/or to meet battery consumption needs/requirements in a manner that increases the savings in battery consumption and processor utilization. In particular, the various embodiments intelligently balance the quality of video displayed against the amount of resources used in rendering the media by allowing higher level components (e.g., application level components) to selectively pull data from lower-level components (e.g., physical-layer or adaptation-layer components). The various embodiments enable applications to pull a subset of content data that may be approximately the minimum amount of the video data required to display the content without noticeably degrading the user experience while saving power and processing operations, thereby providing users with an optimal or near optimal balance between content quality and power consumption.

Data received in the physical layer that is not pulled by the application layer may be discarded (e.g., by being over written in the receiver buffers) with little or no further processing. By pulling data that will be used in the application layer (rather than having to accept all data received by the physical layer) applications may render the media at a level of resolution or quality commensurate with available resources (e.g., power and/or processor availability) while achieving greater efficiency than is possible in conventional media players because power and processor resources are not consumed by communicating (e.g., via a databus), buffering, pre-processing and post-processing data that will not be used for rendering the media.

The various embodiments may be implemented within a variety of networks and/or mobile multi-media systems, an example of which is illustrated in FIG. 1. Specifically, FIG. 1 illustrates that mobile devices 10 may receive content from multimedia broadcast network 1, unicast network 11, or via the Internet 7. A typical multimedia broadcast network 1 includes a plurality of broadcast transmitters 2 controlled by a mobile broadcast network control center/broadcast operation center (BOC) 4. The multimedia broadcast network 1 broadcasts content from the broadcast transmitters 2 as mobile broadcast transmissions 3 for reception by mobile receiver devices 10, such as smart-phones, laptops, personal digital assistants (PDA) and other similar electronic devices. Within the BOC 4, there may be one or more servers and systems 31 for managing content broadcasts, and which provide a connection to the Internet 7.

In addition to, or instead of, the multimedia broadcast network 1, mobile receiver devices 10 may communicate via a unicast network 11, such as a cellular telephone network, WiFi network (not shown), WiMAX, etc. A typical cellular telephone network includes a plurality of cellular base stations 12 coupled to a network operations center 14. The network operations center 14 operates to connect voice and data calls between mobile devices 10 and other network destinations, such as via telephone land lines (e.g., a POTS network, not shown) and the Internet 7.

Communications between mobile receiver devices 10 and the unicast network 11 may be accomplished via two-way wireless communication links 13 such as LTE, 4G, 3G, CDMA, TDMA, and other cellular telephone communication technologies. Such two-way wireless communication links 13 may enable users to stream multimedia content to mobile devices. To facilitate Internet data communications (e.g., streaming video feeds), the unicast network 11 will typically include one or more servers 16 coupled to, or within, the network operations center 14 that provide a connection to the Internet 7. Mobile receiver devices 10 may further connect to the Internet 7 via a wired connection when available, in which case the Internet 7 may serve as the unicast network. Mobile receiver devices 10 may also receive non-broadcast content over the Internet 7 using well known conventional wed-based access protocols.

As an illustration of the types of processing involved in receiving and rendering multimedia content in mobile devices, the following paragraphs illustrate components and processing that is accomplished in encoding, transmitting, receiving, decoding and then rendering multimedia transmitted via a wireless data link.

Figure 2:
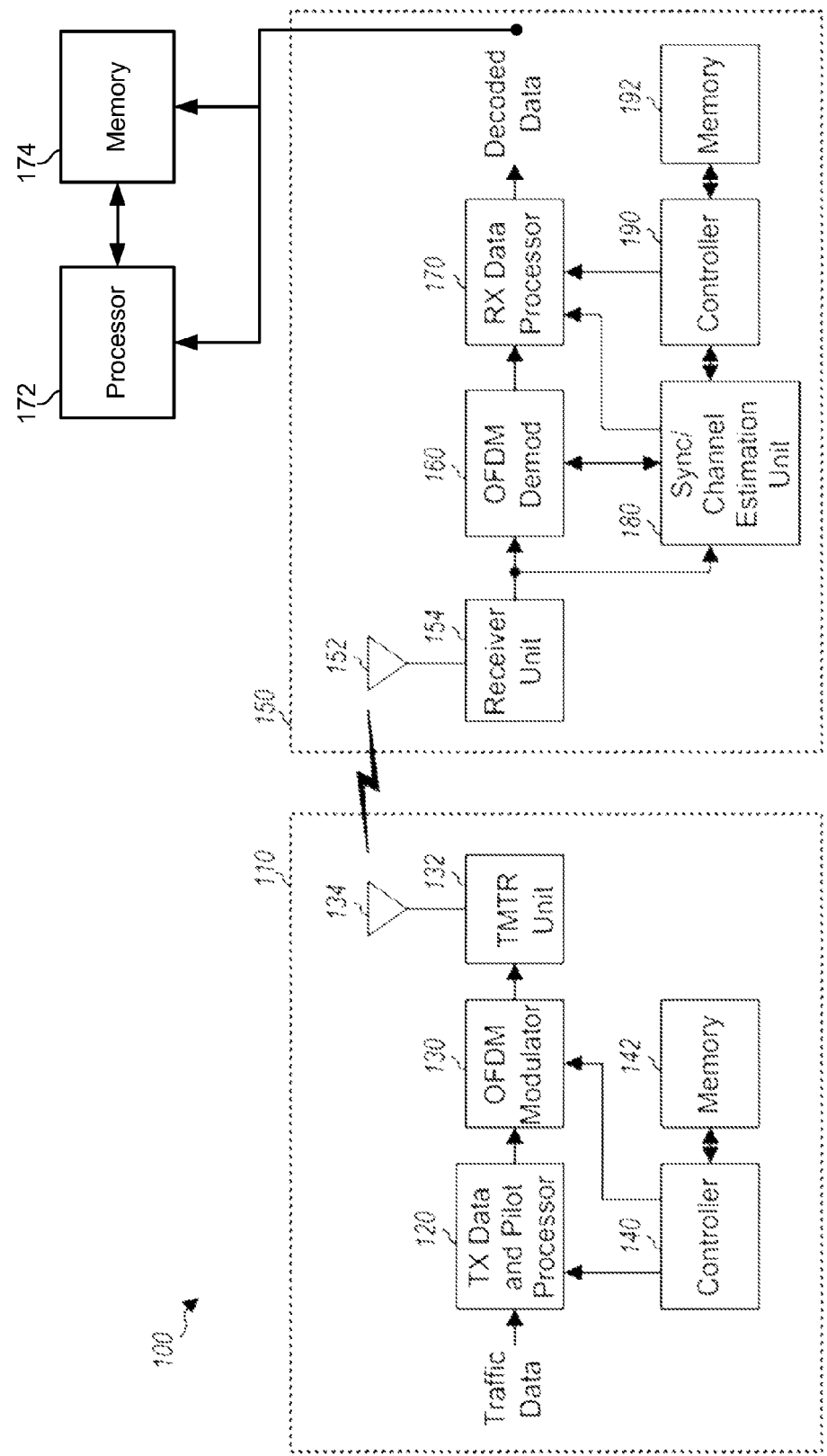
FIG. 2 is a system block diagram of a multimedia base station and a wireless receiver device in an orthogonal frequency-division multiplexing (OFDM) mobile multimedia communication system that may be used with the various embodiments.

FIG. 2 illustrates a block diagram of an example multimedia base station 110 and an example wireless receiver circuit 150 in an orthogonal frequency-division multiplexing (OFDM) mobile multimedia communication system 100 that may be used with the various embodiments. The multimedia base station 110 may be a fixed station, a base transmitter system (BTS), an access point, any other similar component. The wireless receiver circuit 150 may be fixed or mobile.

At the multimedia base station 110, a transmitter (TX) data and pilot processor 120 may receive different types of data (e.g., real time and non-real time content, overhead/control data, etc.) and process (e.g., encode, interleave, symbol map, etc.) the received data to generate data symbols. The transmitter data and pilot processor 120 may also generate pilot symbols, and provide the data and pilot symbols to an OFDM modulator 130. The OFDM modulator 130 may multiplex the data and pilot symbols onto the proper sub-bands and symbol periods, and perform OFDM modulation on the multiplexed symbols to generate OFDM symbols. A transmitter (TMTR) unit 132 may convert the OFDM symbols into one or more analog signals, and further condition (e.g., amplify, filter, frequency upconvert, etc.) the analog signal(s) to generate a modulated signal. The multimedia base station 110 may transmit the modulated signal via an antenna 134 for reception by wireless receivers in the OFDM mobile multimedia communication system 100.

On the receiver side, the wireless receiver circuit 150 may receive the transmitted signal from multimedia base station 110 via an antenna 152 coupled to a receiver unit 154. The receiver unit 154 may condition (e.g., filter, amplify, frequency downconvert, etc.) the received signal, and digitize the conditioned signal to obtain a stream of input samples. The receiver unit 154 may be configured so as to be able to switch between two or more frequencies within short time intervals, enabling the receiver unit 154 to receive symbols from two or more different carriers within a single frame (time hopping). The receiver unit 154 may provide the input samples to an OFDM demodulator 160, which may perform OFDM demodulation on the input samples to obtain received data and pilot symbols. The OFDM demodulator 160 may perform detection (e.g., matched filtering, etc.) on the received data symbols with a channel estimate (e.g., a frequency response estimate, etc.) to obtain detected data symbols, which may be estimates of the data symbols sent by multimedia base station 110. The OFDM demodulator 160 may provide the detected data symbols to a receive (RX) data processor 170.

A synchronization/channel estimation unit (SCEU) 180 may receive the input samples from the receiver unit 154 and perform synchronization operations to determine frame and symbol timing. The SCEU 180 may also derive a channel estimate using pilot symbols received from the OFDM demodulator 160. The SCEU 180 may provide the symbol timing and channel estimate to the OFDM demodulator 160. The SCEU 180 may provide the frame timing to the RX data processor 170 and/or a controller 190. The OFDM demodulator 160 may use the symbol timing to perform OFDM demodulation. The OFDM demodulator 160 may use the channel estimate to perform detection operations on the received data symbols.

The RX data processor 170 processes (e.g., symbol demaps, deinterleaves, decodes, etc.) the detected data symbols from the OFDM demodulator 160 and provides decoded data. The RX data processor 170 and/or controller 190 may use the frame timing to recover different types of data sent by the multimedia base station 110. In general, the processing by the OFDM demodulator 160 and the RX data processor 170 is complementary to the processing by the OFDM modulator 130 and the TX data and the pilot processor 120, respectively, at the multimedia base station 110.

Controllers 140, 190 may direct operations at the multimedia base station 110 and the wireless receiver circuit 150, respectively. The controllers 140, 190 may be processors and/or state machines. Memory units 142, 192 may provide storage for program codes and data used by controllers 140 and 190, respectively. The memory units 142, 192 may use various types of storage medium to store information.

The wireless receiver circuit 150 may be coupled to a processor 172 and a memory 174. The processor 172 may be configured with application software, portions of which may constitute an application layer component, as described below with reference to FIGS. 3 and 4. The combination of the processor 172, memory 174 and wireless receiver circuit 150 provides a computing device suitable for implementing the various embodiments. In such embodiments, the wireless receiver circuit 150 may serve as a network interface to a wireless network through which the computing device may receive content from a streaming content server (not shown in FIG. 2).

As mentioned above, multimedia applications (e.g., media players, etc.) are generally power and computational hungry, and place large demands on essential mobile device resources such as CPUs, batteries, and memories. This due, in part, to the way in which existing solutions receive and process the multimedia streams/broadcasts.

In mobile devices, operations for receiving and rendering content may be divided into separate and independent groups or categories of operations, and each group or category of operations may be assigned to a layer. In each layer, various hardware and/or software components may implement functionality for the layer that is commensurate with responsibilities assigned to that layer. For example, in mobile devices, media streams (e.g., broadcast, point-to-point, etc.) are typically received in a physical layer, which may include a radio receiver, buffers and processing components that perform the operations of demodulating, recognizing symbols within the radio frequency (RF) signal, and performing forward error encoding (FEC) processing necessary to extract raw data from the received RF signal. Existing solutions for receiving streaming video require that the data received in the physical layer be pushed through various layers (e.g., data link layer, network layer, transport layer, etc.) to an application layer, where the data may be processed into information useful for rendering content, such as a video and/or sound.

The pushing of information through the various layers requires processing, transforming, storing and/or accessing information stored in a memory, and may require numerous data transfer and memory access operations. Since these data transfer and memory access operations consume a lot of energy (typically more power than data processing operations) pushing all the received data up to the application layer may be expensive (e.g., in terms of battery drain). Moreover, broadcast flows and streaming media packets typically encode enormous amounts of information, not all of which may be required or used by a multimedia application. Thus, pushing the entire received data stream through the various layers may needlessly consume energy and, in various operating modes, may represent a significant waste of device resources. The various embodiments avoid these wasteful operations (e.g., the lower layers pushing all the data up in the protocol layers) by ensuring that a subset of the content data that is ultimately needed by the application (and thus impacts the user experience in a positive way) is passed up through the layers, stored, and/or processed.

Various embodiments reduce the amount of energy consumed by application layer components (e.g., media player) of mobile computing devices when displaying content, such as streaming or broadcast video, by pulling from a physical layer a subset of the content data that will be processed by the applications layer. Various embodiments reduce the number of data transfer and memory access operations required to receive and display content on mobile devices by determining the amount of information that is required by the media player, and preventing the flow and processing of data that is not required.

Figure 3:
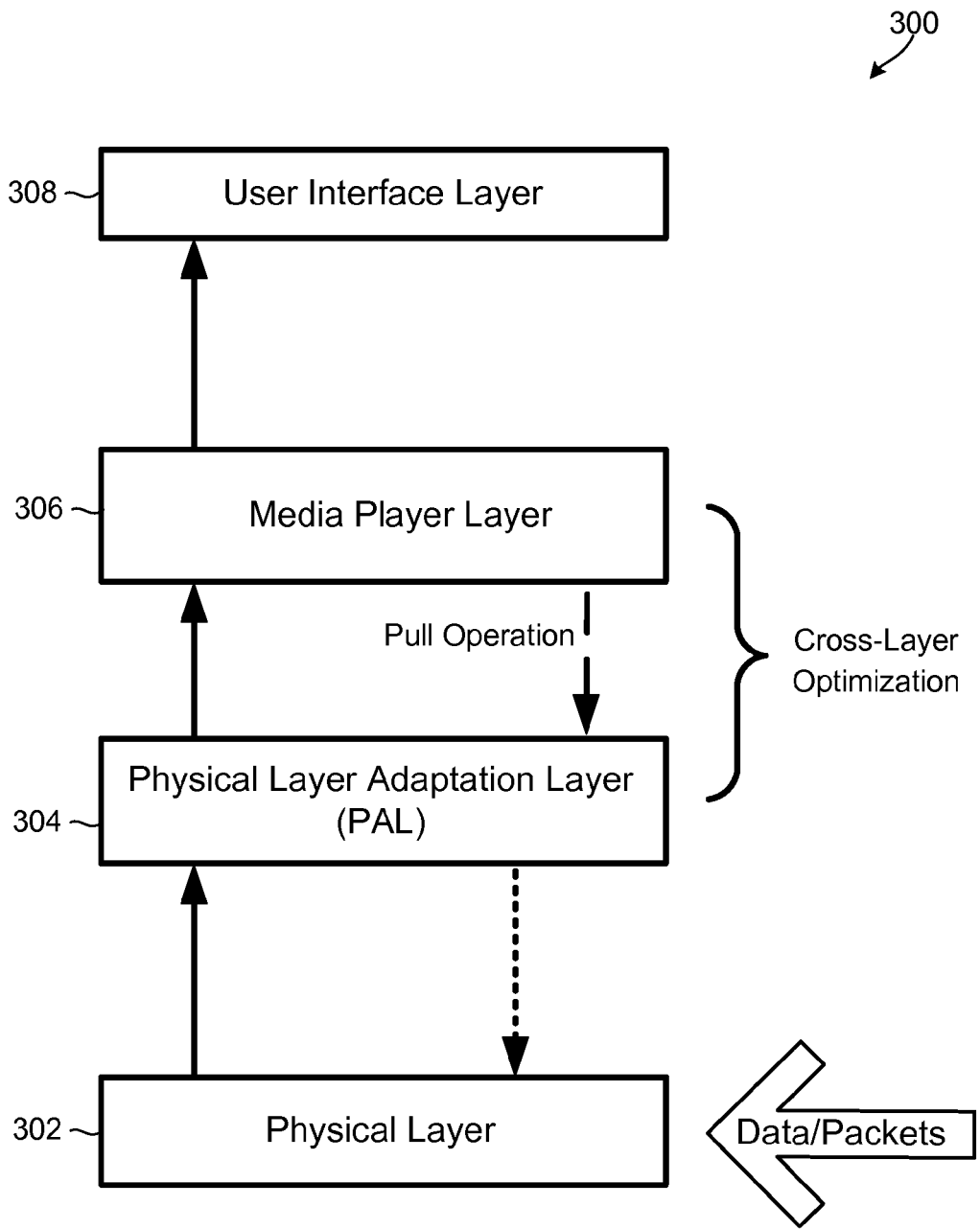
FIG. 3 is a communication and software protocol stack architecture diagram illustrating information flows through the various hardware and software protocol modules according to the various embodiments.

FIG. 3 illustrates information flows through a sample protocol stack 300 of a mobile computing device suitable for receiving and displaying content in accordance with the various embodiments. Specifically, FIG. 3 illustrates multimedia packets received in a physical layer 302 may be pushed up through a physical layer adaptation layer (PAL) 304 to a media player layer 306, with the output provided to a user interface layer 308. Each layer 302, 304, 306, 308 may be implemented in hardware, in software, or in a combination of hardware and software. In an embodiment, the media player layer 306 may be an application layer.

In an embodiment, a cross-layer optimization between the media player layer 306 and physical layer adaptation layer (PAL) 304 may enable a 'pull' operation by a the media player layer 306, as opposed to the traditional 'push' operation from physical layer 302. For example, as video information is received in the physical layer 302 of the mobile device, the media player layer 306 (e.g., multimedia player running on the mobile device processor, etc.) may select and/or "pull" the information that will be saved to memory for further processing, allowing other video information to be discarded or overwritten. The media player layer 306 may make decisions on what is selected/pulled based on various factors, such as resource availability (e.g., instantaneous CPU utilization, remaining battery life, etc.), desired level of user experience (e.g., required presentation quality, frame rate, etc.), and the content to be displayed (e.g., high motion, static, etc.).

In an embodiment, the media player layer 306 may be configured to selectively pull data from the physical layer 302 for storage and manipulation. In an alternative embodiment, the media player layer 306 may set a filter that indicates when the physical layer 302 can push data into a buffer. Video processing operations (e.g., decoding, rendering, etc.) may be adjusted based on the availability of resources, and/or the media player layer 306 may be configured to intelligently balance presentation quality against device resource available in electing video data to pull, and/or in deciding which processing operations to perform, modify, or not perform.

In an embodiment, logic for intelligently identifying and selecting data to be passed to the media player layer 306 may be implemented between the media player layer 306 (i.e., application layer) and the physical adaptation layer 304. The media player layer 306 may be implemented using a cross-layer design (across protocol layers) that enables the performance of optimized/selective data pull operation by the media player layer 306 (vs. the common push-style data up-flow from the lower layers). In an embodiment, a "loosely coupled" cross-layer solution may be implemented in which two non-adjacent protocol layers may be coupled through a simple, limited information carrying message exchange. These embodiments may be implemented via hardware and/or software components in the media player layer 306, such as a media player application.

In the various embodiments, the methods for efficiently receiving and displaying content (e.g., audio-video streams, etc.) on the mobile device by selectively pulling data (e.g., as opposed to pushing data based on content) from the lower layers may be implemented in a processor of the mobile device configured with software instruction within the PAL 304, within the media player layer 306, in between the PAL 304 and the media player layer 306, or partially within both of the PAL 304 and the media player layer 306.

In an embodiment, the physical adaptation layer 304 may be configured to implement or respond to a pull mechanism that allows the media player layer 306 to intelligently request a subset or certain types of received data, such as in a stream of multimedia data. For example, the physical adaptation layer 304 may include logic that enables media player layer 306 components or applications to request or selectively receive the subset of content data they need, which may be determined based the availability of the essential resources (e.g., CPU, power and memory).

Figure 4:
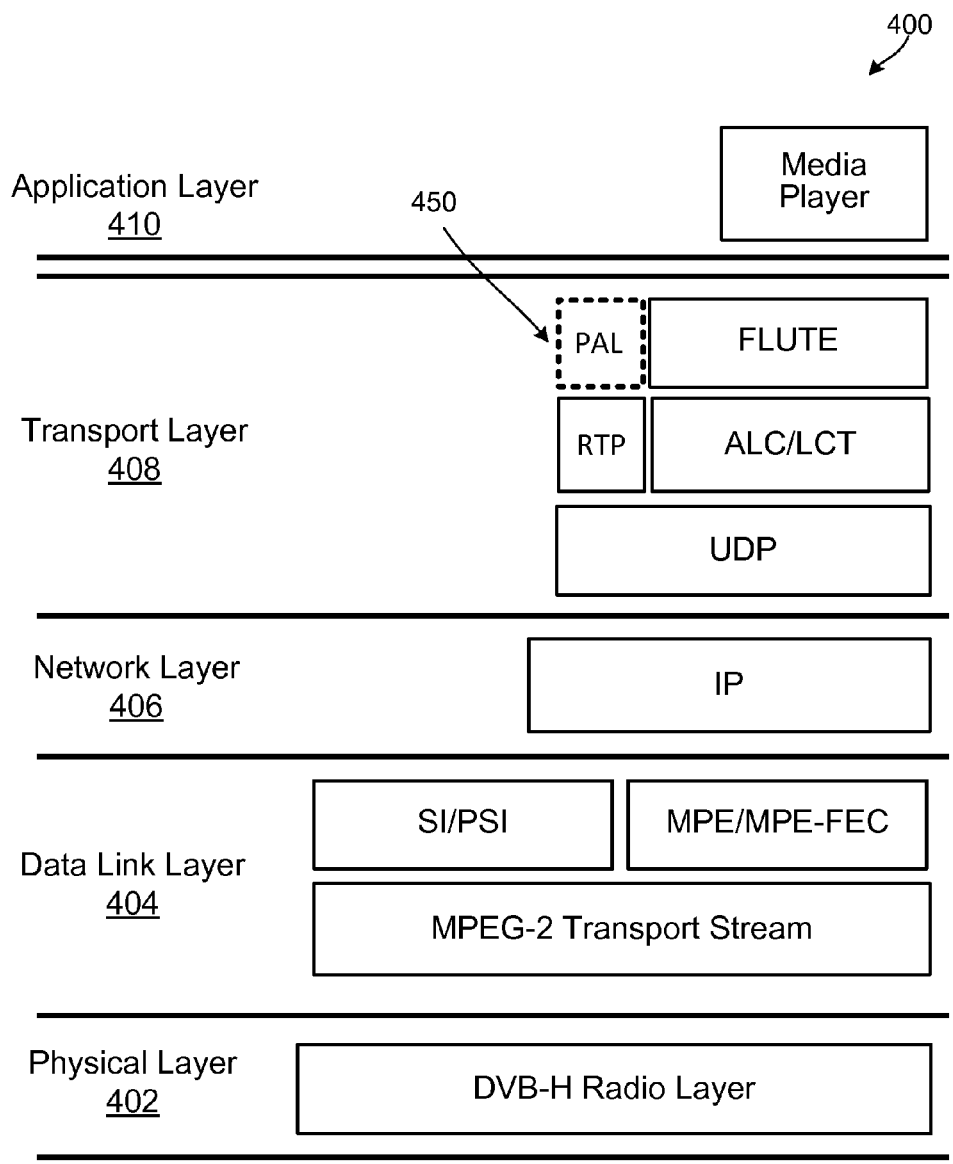
FIG. 4 is another protocol stack architecture diagram illustrating the various layers and information flows through the various hardware and software protocol modules.

FIG. 4 illustrates an example protocol stack 400 of a mobile computing device suitable for receiving and displaying content in accordance an embodiment. In the illustrated example of FIG. 4, the protocol stack 400 includes a physical layer 402, a data link layer 404, a network layer 406, a transport layer 408 and an application layer 410, each of which may be implemented in hardware, in software, or in a combination of hardware and software. In an embodiment, the mobile computing device may implement hardware and software modules as defined by the Telecommunication Industry Association specification TIA 1099.

The physical layer 402 may include radio components that receive the basic signal and provide the received data to a media transport stream (e.g., MPEG-2 Transport Stream) or a media access control module in the data link layer 404. The data link layer 404 may provide addressing and channel access control mechanisms that make it possible for various components of the mobile computing device to receive the different streams of data. The data link layer 404 may also include sub-layers for carrying a packet protocol (e.g., internet protocol) on top of a MPEG transport stream (TS), such as the illustrated multiprotocol encapsulation (MPE)-forward error correction (MPE-FEC) sub-layer and the program and system information (SI/SPI) sub-layer.

Portions of the stream/signal carrying the content and information flows may be passed by the data link layer 404 to the network layer 406, which may include an internet protocol (IP) module/interface for communicating/relaying streams, datagrams and/or packets to the transport layer 408. Streams and data received in the transport layer 408 may be delivered to the appropriate transport layer modules, which process and package the data for transport. In the illustrated example of FIG. 4, the protocol stack may include a user datagram protocol (UDP) module/sub-layer, as well as modules/sub-layers for facilitating communications with the application layer 410, such as an asynchronous layered coding/layered coding transport (ALC/LCT) sub layer, a real-time transport protocol (RTP) sub-layer, and a file delivery over unidirectional transport (FLUTE) sub-layer. The application layer 410 may include protocols and methods required establish host-to-host, end-to-end connections and to conduct process-to-process communications. The application layer 410 may also include end-user applications (e.g., a Media Player) for processing and displaying the content on the mobile computing device.

The protocol stack 400 may also include a physical-layer adaptation layer (PAL) 450 as part of the transport layer 408, between the real-time transport protocol (RTP) sub-layer and the application layer 410. Signals, packages and data arriving at the physical layer 420 may be pushed up through the physical adaptation layer 450 to the application layer (e.g., media player). In an embodiment, methods/logic for receiving and displaying content (e.g., audio-video streams, etc.) on the mobile computing device by selectively pulling data (e.g., as opposed to pushing data based on content) from the lower layers may be implemented in the physical adaptation layer 450.

The physical adaptation layer 450 may include logic that enables application layer 410 components (e.g., media players, etc.) to selectively request data packets, which may be determined based the availability of the essential resources (e.g., CPU, power and memory). In an embodiment, the physical adaptation layer 450 may implement a pull mechanism that allows a media player to intelligently request certain types of data or data elements within a stream of data, such as streaming multimedia data.

As mentioned above, instead of a traditional push operation, various embodiments implement a pull mechanism that allows an application layer component (e.g., a media player) to intelligently request certain types of data. In an embodiment, instead of pulling the data, an application layer component may set a flag accessible by the physical layer (or an intermediate layer) to permit certain frames to be loaded into a memory accessed by the application layer. For example, for each frame, there may exist a Boolean flag or a Boolean state that is turned on or off by the application layer component. If the application layer component determines that the computing device is under heavy load and that the frame rate should be lowered (e.g., from the reception rate of 30 frames per second to 15 frames per second), the media player may set/clear the various flags. If the application layer component determines that it does not need all of the received frames, it may set the Boolean flags accessed by the physical layer (or the intermediate layer), which causes the physical layer to push up to the application layer those frames that correspond to the set flag conditions; frames that do not meet the conditions corresponding to the set flags (i.e., are not needed by the application) may be discarded, such as being overwritten by the next set of frames received by the physical layer component. Thus, by setting such flags, the application is able to effectively 'pull' the desired frames by setting filtering conditions. The application layer component may also determine the number of frames that should be pulled (i.e., passed up to the application layer) per second (e.g., 30 FPS vs. 15 FPS) in order to provide the users an optimal viewing experience consistent with the availability of the resources, and set the flags accordingly.

Figure 5:
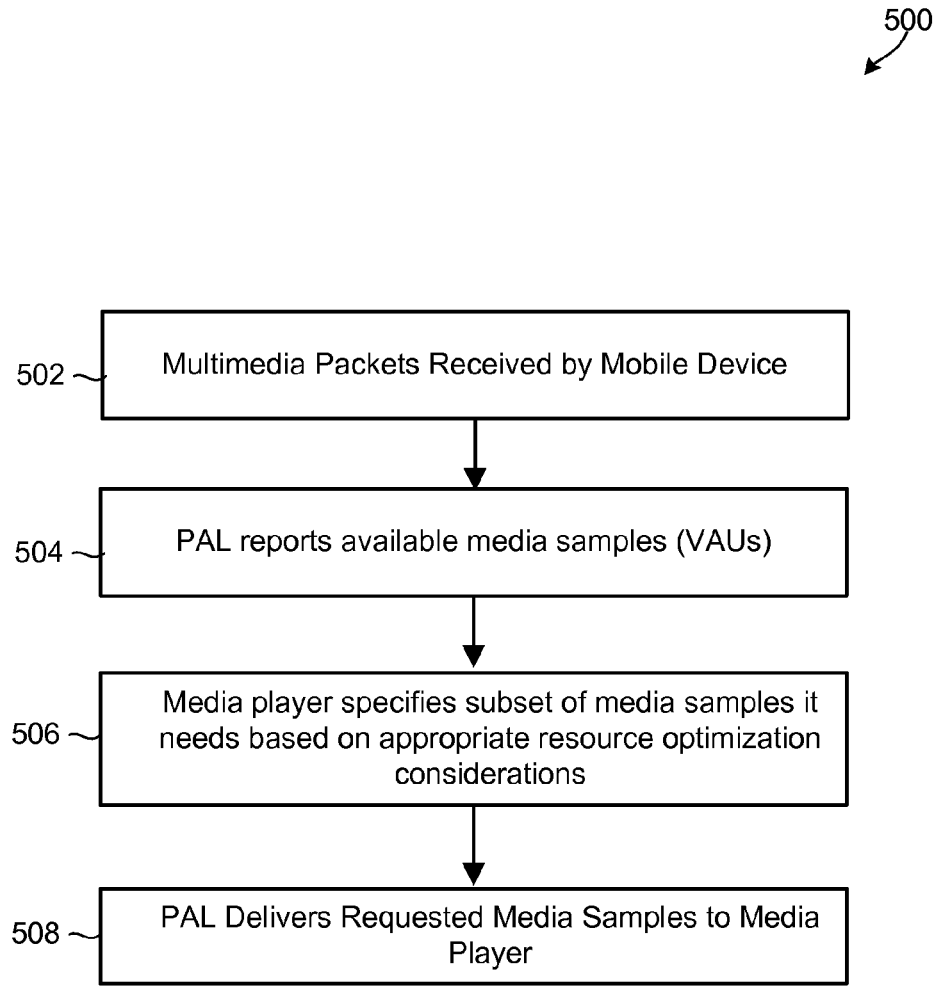
FIG. 5 is process flow diagram of an embodiment method for receiving multimedia packets and delivering media samples to a media player.

FIG. 5 illustrates an embodiment method 500 for receiving multimedia packets in a computing device and delivering media samples to an application level component, such as a media player. In block 502, multimedia packets may be received by a physical layer component of the mobile device and reported to a physical layer adaptation layer (PAL) component. In block 504, the physical layer adaptation layer (PAL) component may report available media samples (VAUs) to the media player, such as by setting a state flag accessible by the media player application. In block 506, the media player may specify and/or pull the subset of content data (e.g., frames) it needs based on appropriate resource optimization considerations. In block 508, the requested or pulled data/frames may be delivered by the PAL to the media player.

Figure 6:
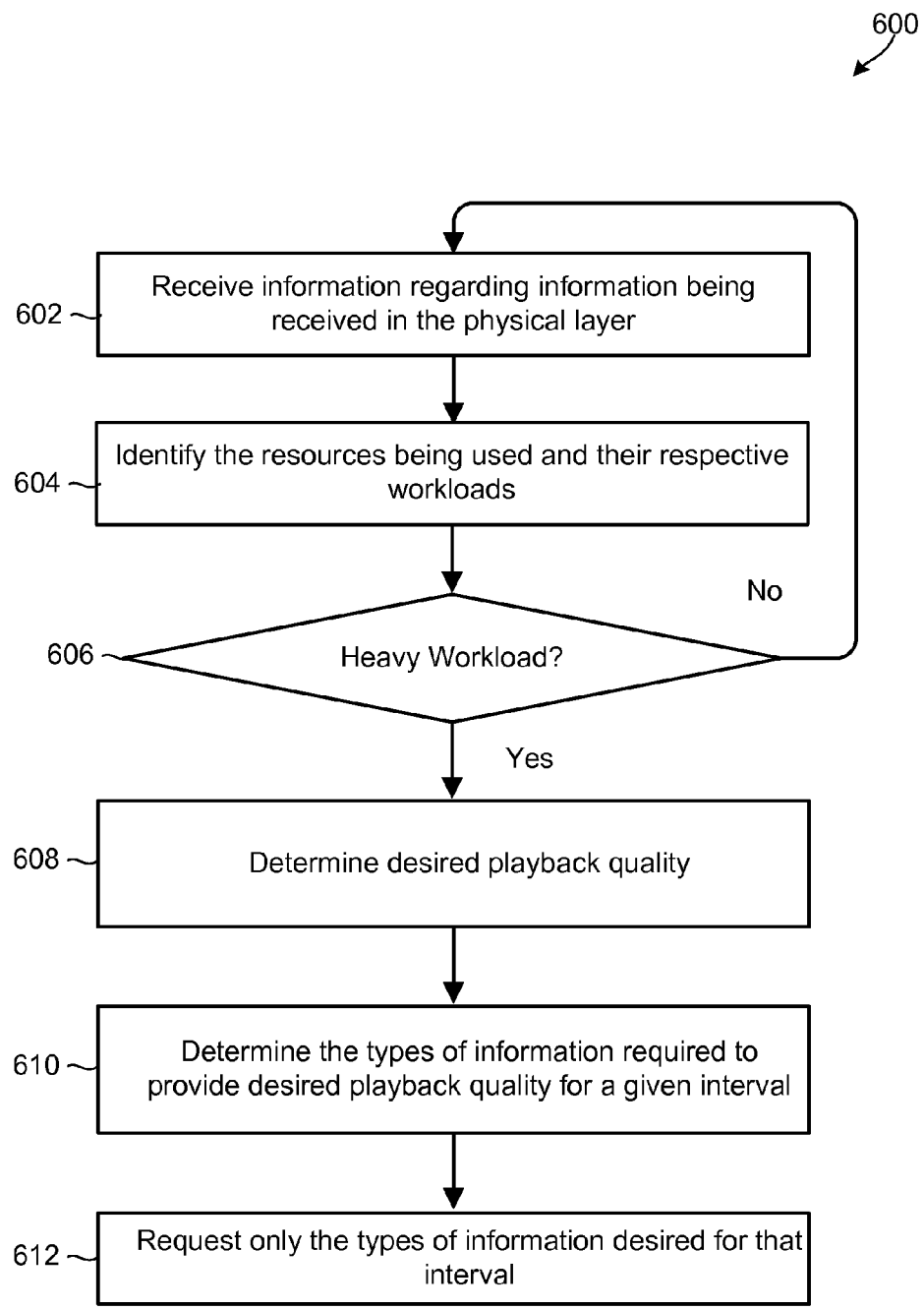
FIG. 6 is process flow diagram of an embodiment method for pulling media samples based on resource availability.

As mentioned above, the application layer component (e.g., a media player) may be aware of the system state (e.g., in terms of resources) and may make intelligent decisions regarding the types of information that should be propagated up through the layers. FIG. 6 illustrates an embodiment method 600 for intelligently selecting the types of information that should be propagated up to the application layer component (e.g., a media player) in order to reduce and/or avoid the wasteful storage and processing of information that is not ultimately utilized by the application layer component. In an embodiment, method 600 may be performed as part of block 506 discussed above with reference to FIG. 5, in which the application layer component (e.g., a media player) specifies and/or pulls data (e.g., frames) based on resource optimization considerations.

In block 602, the application layer component may receive information regarding the information being received in the physical layer (e.g., the types of video frames being received) from a lower layer component (e.g., a PAL layer component, physical layer component, etc.). For example, components in the lower layers (e.g., physical adaptation layer, physical layer) may send the application layer component a message that indicates a video frame has been received, and identifies one or more coding types associated with the received frame. In block 604 the application layer component may identify the resources being used and their respective workloads. In determination block 606, the application layer component may determine whether the computing device is under a heavy workload based on the identified workloads and resource usage. If it is determined that the computing device is not under a heavy workload (determination block 606="No"), the application layer may perform operations using all the received information. On the other hand, if it is determined that the computing device is under a heavy workload (determination block 606="Yes"), in block 608, the application layer component may determine a suitable or desirable playback quality.

In block 610, the application layer component may determine the types of information desired/required over a given interval (e.g., 1 second, 2 seconds, etc.) to provide the determined quality of playback. In block 612, the application layer component may request only the types of information desired for that interval. For example, the application layer component may determine, based on the available coding types and desired/required quality of service, the portions of the received frames that are advantageous for providing the users the desired/required quality of service. As part of block 612, the application layer component may pull/permit the determined portions of the received frames and/or select coding types to propagate to the application level. This may be achieved by, for example, the application layer component setting/clearing various Boolean flags accessed by the physical layer (or an intermediate layer).

In an embodiment, the application layer component may adapt to changing (transient or gradual) device resource availability conditions pertaining to power consumption, CPU consumption, memory utilization and other device resources, improving the overall device performance and the user experience.

Figure 7A:
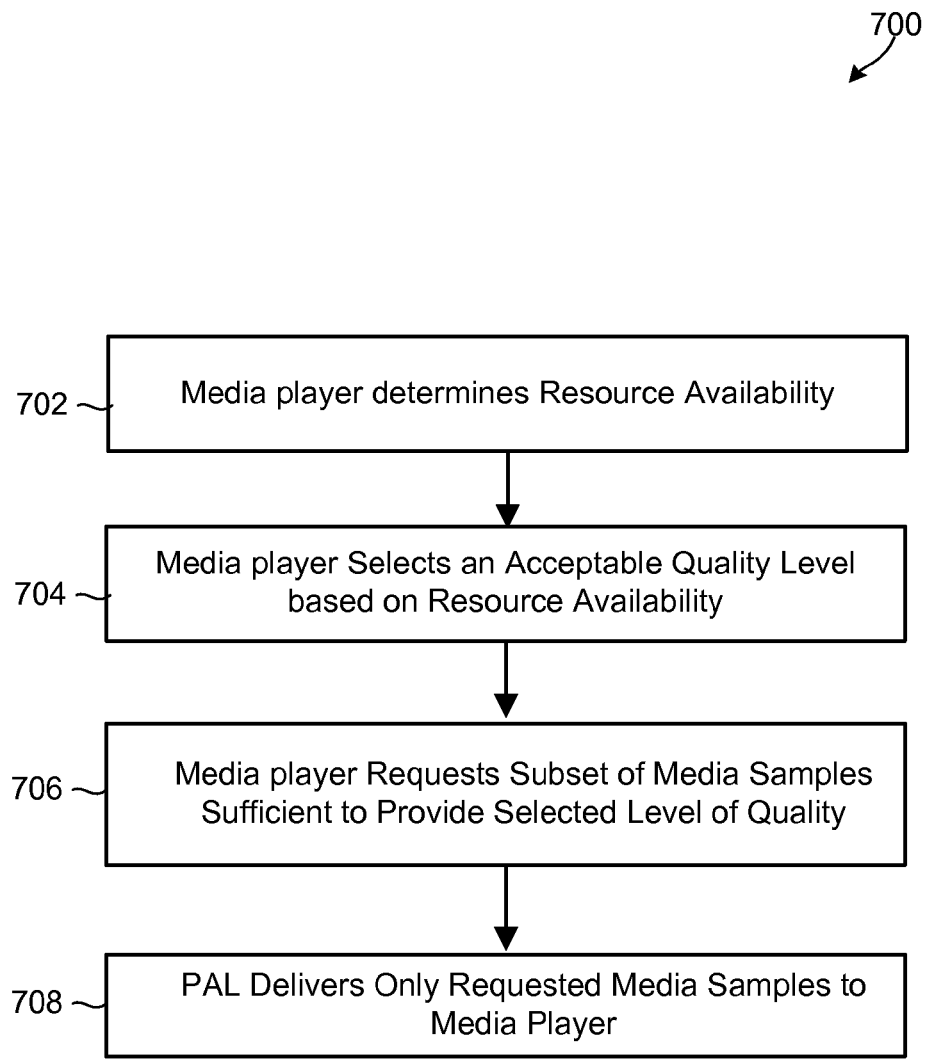
FIG. 7A is process flow diagram of an embodiment method for requesting media samples based on resource availability.

FIG. 7A illustrates an embodiment method 700 for requesting media samples based on resource availability. In block 702, the media player may determine resource availability. In block 704, the media player may select an acceptable quality level. In an embodiment, the acceptable quality level may be determined based on an availability of resources. In block 706, the media player may request a subset of the media samples that is sufficient to provide the selected quality level. For example, the media player may select an appropriate subset of information to pull based on current/projected device resource status. In doing so, the media player may evaluate or consider one or more tradeoffs between computation complexity and presentation quality, enabling the media player to select one or more sets of non-standardized display processing operations (e.g., image resizing, color space conversion, de-noising/de-ringing) that are to be performed. In block 708, the physical layer adaptation layer (PAL) component may send the media player the requested subset of media samples, and discard all other samples.

Figure 7B:
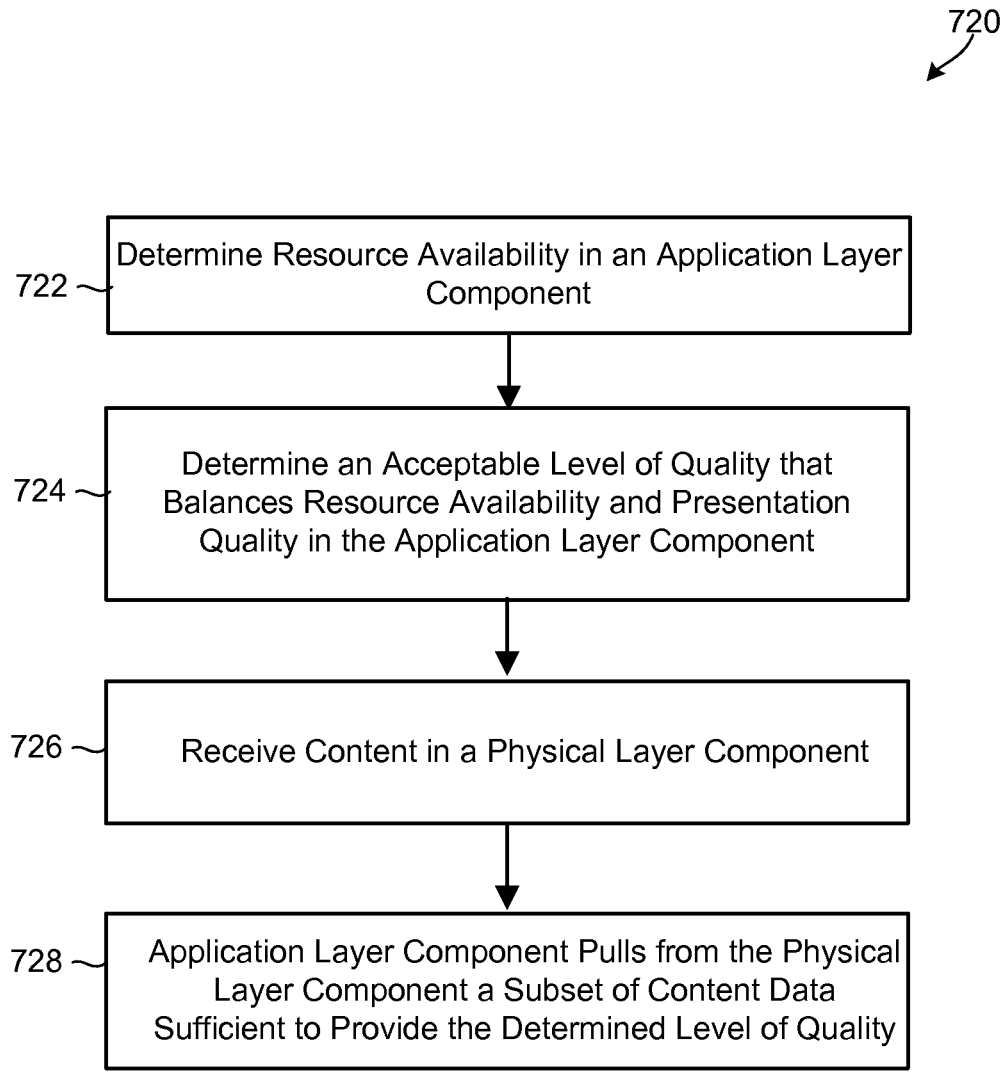
FIG. 7B is process flow diagram of an embodiment method for enhancing the user experience and mobile device performance of a mobile device having a physical layer component and an application layer component by pulling a subset of content data sufficient to provide a certain level of quality from a physical layer component.

FIG. 7B illustrates an embodiment mobile device method 720 for enhancing the user experience and mobile device performance of a mobile device having a physical layer component and an application layer component. In block 722, the application layer component of the mobile device may determine the availability of mobile device resources. In block 724, the application layer component may determine an acceptable level of quality that balances resource availability with presentation quality. In block 726, the mobile device may receive content (e.g., video, etc.) in the physical layer component. In block 728, the application layer component may pull from the physical layer component a subset of the content data that is sufficient to provide the determined acceptable level of quality that balances resource availability with presentation quality.

Figure 7C:
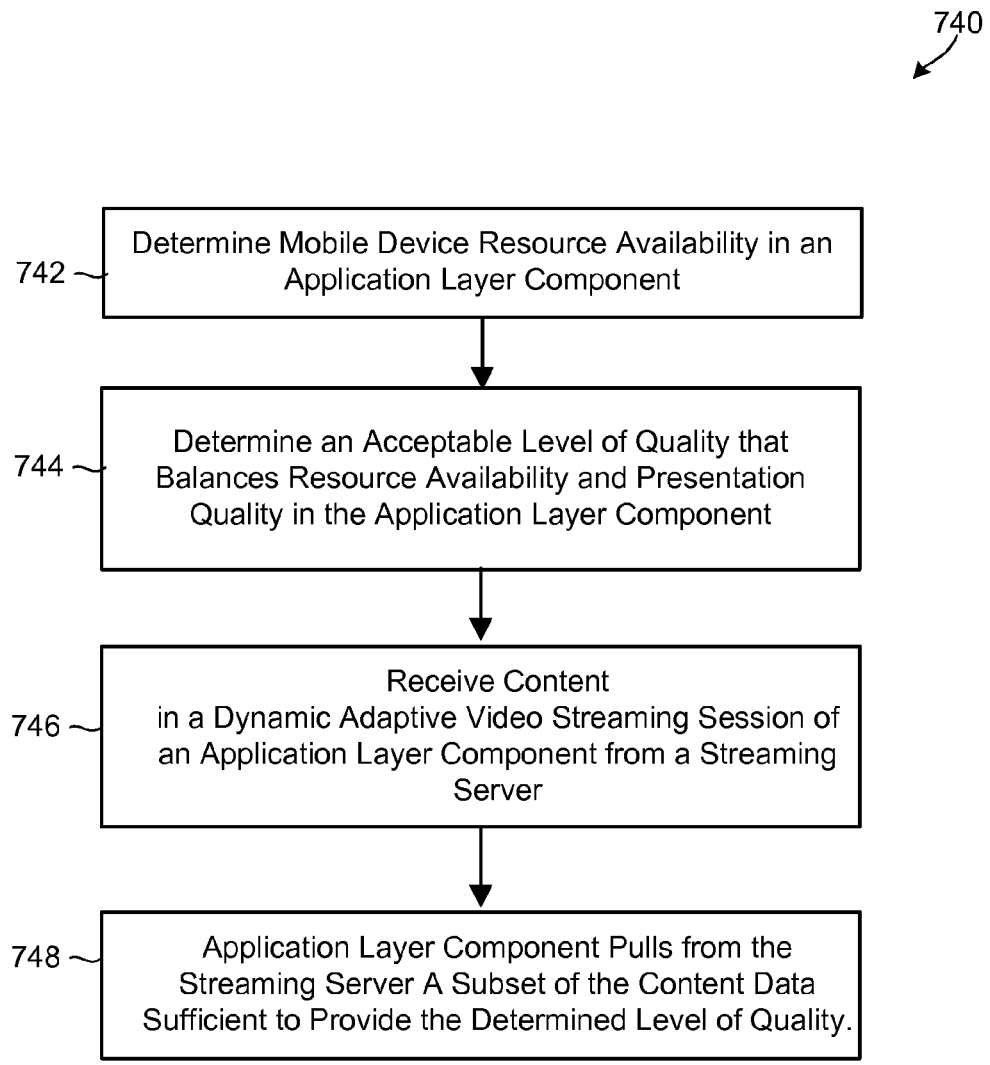
FIG. 7C is process flow diagram of an embodiment method for enhancing the user experience and mobile device performance of a mobile device having an application layer component by pulling a subset of content data sufficient to provide a certain level of quality from a streaming server.

FIG. 7C illustrates an embodiment mobile device method 740 for enhancing the user experience and mobile device performance of a mobile device having an application layer component. In block 742, the application layer component of the mobile device may determine the availability of mobile device resources. In block 744, the application layer component may determine an acceptable level of quality that balances resource availability with presentation quality. In block 746, the mobile device may receive content (e.g., video, etc.) in a dynamic adaptive video streaming session of an application layer component form a streaming server. In block 748, the application layer component may pull from the streaming server a subset of the content data that is sufficient to provide the determined acceptable level of quality.

In the various embodiments, in addition to considering the availability of resources, the media player may also select/pull video information based on video information. For example, if it is determined that the device is under a heavy workload and/or that resources should be conserved (e.g., the device is running on battery power), the media player may monitor motion vectors in the video information to detect when the images are still (or moving very slowly). For segments having little or no movement, the media player may elect to skip certain frames. This would allow the computing device to reduce the total number of frames stored and processed per second for segments that do not require rapid refresh rates while providing users with a satisfactory experience.

In an embodiment, the media player may request certain types of data (e.g., I frames and B frames) when resources are abundant, and other types of data (e.g., B frames only) when resources are more limited.

In certain situations, there may be network fluctuations (e.g., changes in the availability of resources) that cause the status of the shared delivery network to change over time. If a client computing device (e.g., laptop, WIFI component, handset, desktop, set-top box, apple TV, etc.) observes that the latency of the data delivery is increasing (e.g., packets are arriving later than expected), the client device may perform operations to manage the reception of data. Otherwise, the client buffer may under-run and cause a glitch or a pause is in the video playback (i.e., client may experience a ripple frame). Technologies that support "dynamic adaptively" allow the client to respond to such changes in the status of the delivery network. For example, certain technologies, such as dynamic adaptive streaming over HTTP (DASH), adjust the quality of video streams being transmitted based on the receiving device's available bandwidth and CPU capabilities, in real time. That is, these technologies support "dynamic adaptively" by generating multiple versions of each video stream that is to be sent. For example, a content generation server may read in one raw video file and generate the multiple versions of the file for delivery over a generative IP network. Each version may support a specific combination of bandwidths, bit rates, quotas, resolutions, spatial resolutions, temporal resolutions, frame rate, qualities, etc. This enables the computing device to request a different version of the video stream based on the latency of data delivery. Such requests may be accomplished via the various embodiments, ensuring that only the selected file version or subset of the media content is passed up to the media player or other application in the application layer.

Also on shared networks, clients may have variable capabilities. For example, an up-to-date laptop computer may have a faster GPU and CPU, and may be able to handle higher bandwidths than a miniature handset. Since each computing device is aware of its capabilities, the device processor may request a particular version of the content that is commensurate with its capabilities. However, existing solutions do not allow for the type of content requested from the server to be based on the device resource availability conditions pertaining to power consumption, CPU consumption, memory utilization and other device resources. In an embodiment, a computing device may be configured to request a certain type or version of content from the server to be based on the device resource availability conditions pertaining to power consumption, CPU consumption, memory utilization and other device resources, improving the overall device performance and the user experience.

In an embodiment, the computing device may be configured to increase or decrease the video quality in response to power, processor and other resource constraints. In an embodiment, certain frames of information may be skipped such that the computing device does not gather, receive, store or buffer the skipped frames. In an embodiment, the computing device radio may be turned off for the skipped frames in order to further conserve battery power. For example, if the computing device determines that certain frames are to be skipped, the radio may be powered down during the times when those frames are transmitted and powered back up in time to receive the next requested frame.

In an embodiment, the computing device may be configured to identify the OFDM symbols carrying particular types of data (e.g., reference frames, etc.) and power down the radio during the transmission of OFDM symbols that do not carry information that has been requested or pulled by the media player or other application.

In an embodiment, the content may be carried in scalable bit streams encoded using scalable video coding (SVC). A subset video bitstream may derived by dropping packets from the larger video to reduce the bandwidth required for the subset bitstream. The subset bitstream may represent a lower spatial resolution (smaller screen), lower temporal resolution (lower frame rate), or lower quality video signal. The scalable video coding may include a base layer and an enhancement layer. Each of the base and enhancement layers may be placed in certain symbols (e.g., E, D). The computing device may be configured to filter below the application layer the received information based on these layers (e.g., base, enhancement layer) and/or based on the symbols (e.g., E, D) carrying those layers. In an embodiment, rather than receiving and discarding the received information (e.g., packets, symbols, etc.), the computing device may power down the radio and not receive the information at all, thereby selecting the information that is received. The radio may be powered down based on descriptions of data broadcast ahead of the information.

Figure 8:
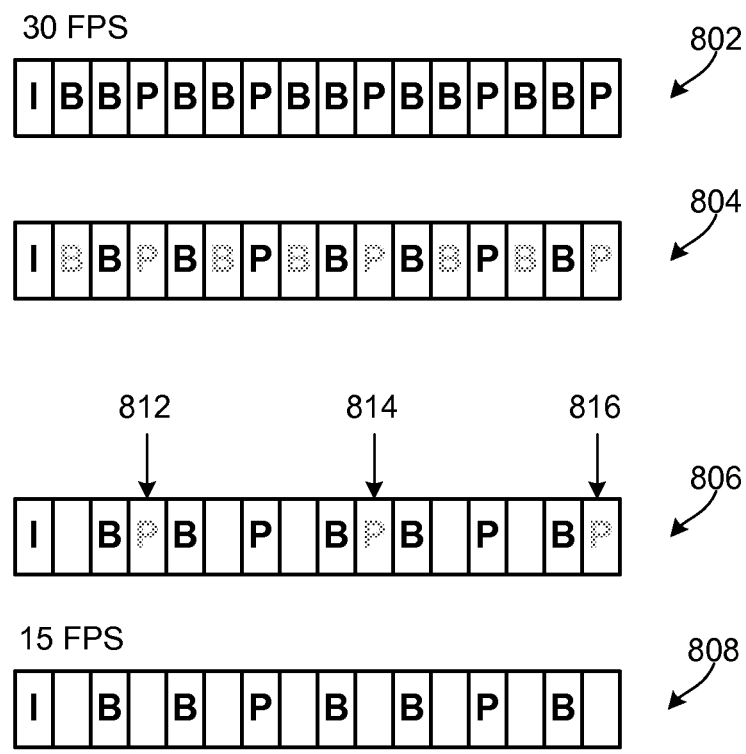
FIG. 8 is an illustration that illustrates how a media player and a physical adaptation layer component may work together to reduce the number of frames of data that are processed.

FIG. 8 illustrates how a media player and a PAL component may work together to provide video frame data (namely I frames, B frames and P frames) in order to reduce the number of frames of data that are processed. In step 802, the video data may be provided at a first frame rate, such as 30 frames per second (fps), in a stream of IBBPBBP frames. In step 804, the media player may determine a frame rate at which to present the media in view of current resource limitations/requirements, as well as makes a determination regarding the frame rate at which the video can be presented without impacting the user experience. In the illustrated example of FIG. 8, in step 804, the media player may determine to reduce the media rate from 30 fps to 15 fps, and identify the frames that are to be pulled and/or the frames that are not the be pulled. In step 806, the media player may identify, request, pull, receive and decode the pulled frames that are received from the physical layer. In an embodiment, the media play may choose to not exclude frames 812, 814, 816 that include data needed to enable the bi-directional frame (B frame decoding), even though those frames are not ultimately rendered. In step 806, frames 812, 814, 816 may be discarded, and the pulled frame data may be presented to the users at the frame rate determined in step 804.

Various embodiments include methods of enhancing user experience and mobile device performance in a mobile device having an application layer component, which may include determining mobile device resource availability in the application layer component, determining an acceptable level of quality that balances resource availability and presentation quality in the application layer component, receiving in a dynamic adaptive video streaming session of the application layer component content from a streaming server; and the application layer component pulling from the streaming server a subset of content data, the subset being sufficient to provide the determined level of quality. Such a subset of content data may be only those content samples or frames that are needed by the mobile device to provide the determined level of quality, but may include additional samples or frames. The dynamic adaptive video streaming session may be a DASH application or other similar dynamic, adaptive video streaming technologies/applications. In such embodiments, the application layer has the best understanding of the media it is processing, and is thus configured to processes the content data to improve both device performance and user experience when mobile device resources are becoming scarce/bottleneck.

DASH and other similar dynamic, adaptive video streaming applications (e.g. proprietary applications from Netflix®, Apple®, Microsoft®, Adobe®, etc.) may concentrate on dynamic adaptation of the streamed content representation based on network conditions (e.g., network throughput, bandwidth, network latency, and packet error/loss rates), device capabilities (e.g., network interface card capacity, reception quality, processor speed, display resolution, and display refresh rate), or user preferences (e.g., start-up latency, initial buffering period, spatial resolution, frame rate, and fidelity). However, these solutions do not account for device resources that may become dynamic bottlenecks and/or may otherwise impact various applications' performance. As such, existing solutions do not determine an acceptable level of quality that balances resource availability and presentation quality in the application layer component. For example, in various embodiments, a mobile device may begin displaying a video in high definition at 30 frames per second, and switch to displaying the video in standard definition at 15 frames per second when the battery level decreases below a certain threshold during the active streaming session.

Figure 9:
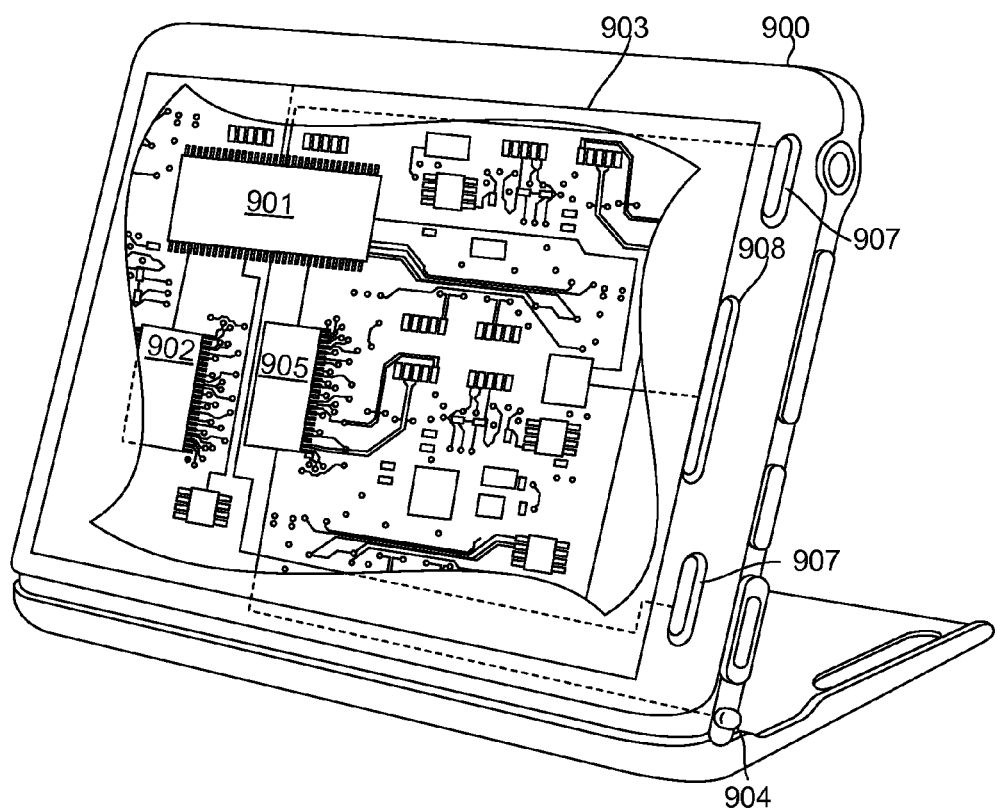
FIG. 9 is a system block diagram of a receiver device suitable for use with any of the embodiments.

FIG. 9 is a system block diagram of a mobile computing device suitable for use with any of the embodiments. A typical mobile computing device 900 may include a processor 901 coupled to internal memory 902, to a display 903, and to a speaker 908. Additionally, the mobile computing device 900 will include an antenna 904 for sending and receiving electromagnetic radiation that may be connected to a wireless data link and/or cellular telephone transceiver 905 coupled to the processor 901 and a mobile multimedia broadcast receiver 906 coupled to the processor 901. A mobile computing device 900 typically also includes menu selection buttons 907 or rocker switches for receiving user inputs.

Figure 10:
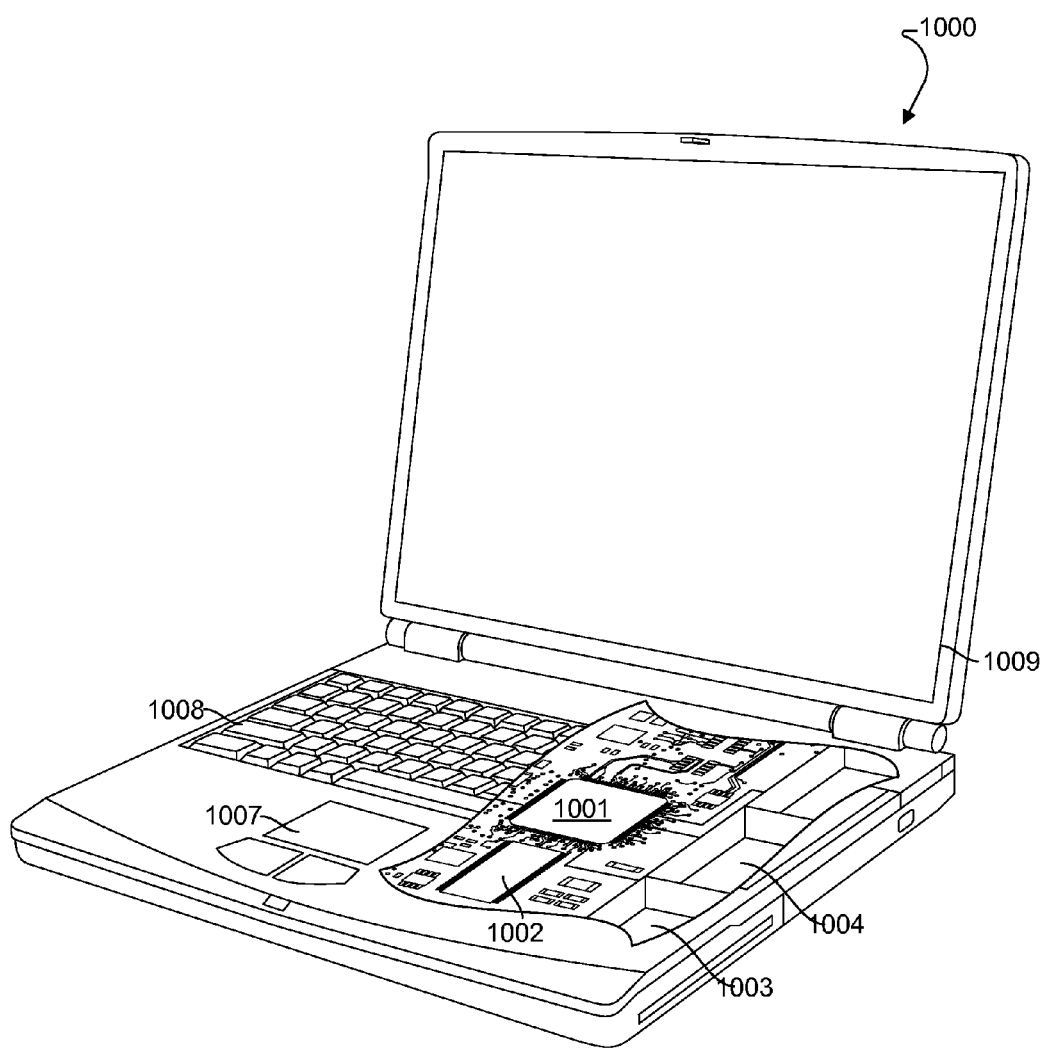
FIG. 10 is a system block of a laptop computer suitable for use with any of the embodiments.

The various embodiments on the broadcast side may be implemented on any of a variety of commercially available computing devices, such as the laptop 1000 illustrated in FIG. 10. Such a laptop 1000 typically includes a processor 1001 coupled to volatile memory 1002 and a nonvolatile memory, such as a disk drive 1003. The laptop 1000 may also include a floppy disc drive, compact disc (CD) or DVD disc drive coupled to the processor 1001. The laptop 1000 may also include a display 1009, keyboard 1008, input devices 1007 for receiving user input and network access ports 1004 coupled to the processor 1001 for establishing data connections with a network, such as a local area network coupled to other broadcast system computers and servers.

The processors 901, 1001 may be any programmable microprocessor, microcomputer or multiple processor chip or chips that can be configured by software instructions (applications) to perform a variety of functions, including the functions of the various embodiments described above. In some mobile receiver devices, multiple processors 801 may be provided, such as one processor dedicated to wireless communication functions and one processor dedicated to running other applications. Typically, software applications may be stored in the internal memory 902, 1002, 1003 before they are accessed and loaded into the processor 801, 1001. The processor 901, 1001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of enhancing user experience and mobile device performance in a mobile device having a physical layer component and an application layer component, the method comprising:
   determining resource availability in the application layer component of the mobile device;
   determining an acceptable level of quality that balances resource availability and presentation quality in the application layer component;
   receiving content in the physical layer component, wherein the content comprises compressed video frames; and
   the application layer component pulling from the physical layer component a subset of content data, the subset being sufficient to provide the determined level of quality, wherein the application layer does not pull reference video frames and non-reference video frames following the reference video frames in presentation order until an earliest scene change instant when the earliest scene change instant is detected to occur sooner than a threshold duration.

2. The method of claim 1, wherein determining an acceptable level of quality that balances resource availability and presentation quality comprises the application layer component communicating with an operating system of the mobile device through a programming interface.

3. The method of claim 1, wherein determining an acceptable level of quality that balances resource availability and presentation quality in the application layer component comprises determining whether the mobile device is connected to a steady power source.

4. The method of claim 1, wherein determining an acceptable level of quality that balances resource availability and presentation quality in the application layer component comprises monitoring battery power.

5. The method of claim 1, wherein pulling from the physical layer component a subset of content data sufficient to provide the determined level of quality comprises pulling content data based on the determined resource availability.

6. The method of claim 5, wherein pulling content data based on the determined resource availability comprises pulling content data based on at least one of:
   instantaneous processor utilization;
   average processor utilization;
   remaining battery power of the mobile device;
   instantaneous power consumption;
   average power consumption;
   idle processor cycles;
   available system memory; and
   available system memory bandwidth.

7. The method of claim 5, wherein pulling from the physical layer component a subset of content data sufficient to provide the determined level of quality comprises the physical layer component declining to receive one or more of non-reference video frames and enhancement layer video frames in a video data stream.

8. The method of claim 5, further comprising:
   changing a decode frame rate by not decoding at least one received non-reference video frame.

9. The method of claim 5, wherein pulling from the physical layer component a subset of content data sufficient to provide the determined level of quality comprises the physical layer component declining to receive at least one or more of reference video frames and any non-reference video frames following the reference video frames in presentation order until the earliest scene change is detected to occur sooner than the threshold duration.

10. The method of claim 5, further comprising:
    changing a render frame rate by not rendering at least one or more video frames after decoding.

11. The method of claim 5,
    wherein pulling from the physical layer component a subset of content data sufficient to provide the determined level of quality comprises one of:

simplifying or skipping deblocking of non-reference frames; and
simplifying or skipping deblocking of reference frames when a full screen refresh is detected to occur sooner than the threshold duration, and
wherein the method further comprises substituting a default higher complexity and higher performance spatial resizing algorithm used for display with a lower complexity algorithm.

12. The method of claim 5, wherein pulling from the physical layer component a subset of content data sufficient to provide the determined level of quality comprises:
powering off a radio module of the mobile device during transmission of video frames not required such that the physical layer component does not receive these video frames.

13. The method of claim 5, wherein determining an acceptable level of quality that balances resource availability and presentation quality in the application layer component comprises collecting data and reporting utilization and availability information to one or more application layer components.

14. The method of claim 5, further comprising:
transitioning from a higher quality to a lower quality when resources are scarce; and
transitioning from the lower quality back to the higher quality when resources are no longer scarce.

15. A computing device, comprising:
a receiver circuit configured to receive content;
a memory; and
a processor coupled to the memory and the receiver circuit, wherein the processor is configured with processor-executable instructions to perform operations comprising:
determining resource availability of the computing device;
determining an acceptable level of quality that balances resource availability and presentation quality; and
pulling from the receiver circuit a subset of content data, the subset being sufficient to provide the determined level of quality, wherein the subset of content data comprises received compressed video frames and pulling from the receiver circuit the subset of content data comprises not pulling at least one or more of reference video frames and any non-reference video frames following the reference video frames in presentation order until an earliest scene change instant when the earliest scene change instant is detected to occur sooner than a threshold duration.

16. The computing device of claim 15, wherein the processor is configured with processor-executable instructions such that determining an acceptable level of quality that balances resource availability and presentation quality comprises communicating with an operating system through a programming interface.

17. The computing device of claim 15, wherein the processor is configured with processor-executable instructions such that determining an acceptable level of quality that balances resource availability and presentation quality comprises determining whether the computing device is connected to a steady power source.

18. The computing device of claim 15, wherein the processor is configured with processor-executable instructions such that determining an acceptable level of quality that balances resource availability and presentation quality comprises monitoring battery power.

19. The computing device of claim 15, wherein the processor is configured with processor-executable instructions such that pulling from the receiver circuit a subset of content data sufficient to provide the determined level of quality comprises pulling content data based on the determined resource availability.

20. The computing device of claim 19, wherein the processor is configured with processor-executable instructions such that pulling content data based on the determined resource availability comprises pulling content data based on at least one of:
instantaneous processor utilization;
average processor utilization;
remaining battery power of the computing device;
instantaneous power consumption;
average power consumption;
idle processor cycles;
available system memory; and
available system memory bandwidth.

21. The computing device of claim 19, wherein the processor is configured with processor-executable instructions such that pulling from the receiver circuit a subset of content data sufficient to provide the determined level of quality comprises the receiver circuit declining to receive one or more of non-reference video frames and enhancement layer video frames in a video data stream.

22. The computing device of claim 19, wherein the processor is configured with processor-executable instructions to perform operations further comprising:
changing a decode frame rate by not decoding at least one received non-reference video frame.

23. The computing device of claim 19, wherein the processor is configured with processor-executable instructions such that pulling from the receiver circuit a subset of content data sufficient to provide the determined level of quality comprises the receiver circuit declining to receive at least one or more of reference video frames and any non-reference video frames following the reference video frames in presentation order until the earliest scene change is detected to occur sooner than the threshold duration.

24. The computing device of claim 19, wherein the processor is configured with processor-executable instructions to perform operations further comprising:
changing a render frame rate by not rendering at least one or more video frames after decoding.

25. The computing device of claim 19,
wherein the processor is configured with processor-executable instructions such that pulling from the receiver circuit a subset of content data sufficient to provide the determined level of quality comprises one of:
simplifying or skipping deblocking of non-reference frames; and
simplifying or skipping deblocking of reference frames when a full screen refresh is detected to occur sooner than the threshold duration, and
wherein the processor is configured with processor-executable instructions to perform operations further comprising substituting a default higher complexity and higher performance spatial resizing algorithm used for display with a lower complexity algorithm.

26. The computing device of claim 19, wherein the processor is configured with processor-executable instructions such that pulling from the receiver circuit a subset of content data sufficient to provide the determined level of quality comprises:
powering off a radio module of the computing device during transmission of video frames not required such that the receiver circuit does not receive these video frames.

27. The computing device of claim 19, wherein the processor is configured with processor-executable instructions such that determining an acceptable level of quality that balances resource availability and presentation quality comprises collecting data and reporting utilization and availability information.

28. The computing device of claim 19, further comprising:
    transitioning from a higher quality to a lower quality when resources are scarce; and
    transitioning from the lower quality back to the higher quality when resources are no longer scarce.

29. A computing device, comprising:
    means for receiving content;
    means for determining resource availability of the computing device;
    means for determining an acceptable level of quality that balances resource availability and presentation quality; and
    means for pulling a subset of content data, the subset being sufficient to provide the determined level of quality, wherein the subset of content data comprises received compressed video frames and the means for pulling the subset of content data comprises means for not pulling at least one or more of reference video frames and any non-reference video frames following the reference video frames in presentation order until an earliest scene change instant when the earliest scene change instant is detected to occur sooner than a threshold duration.

30. The computing device of claim 29, wherein means for determining an acceptable level of quality that balances resource availability and presentation quality comprises means for communicating with an operating system through a programming interface.

31. The computing device of claim 29, wherein means for determining an acceptable level of quality that balances resource availability and presentation quality comprises means for determining whether the computing device is connected to a steady power source.

32. The computing device of claim 29, wherein means for determining an acceptable level of quality that balances resource availability and presentation quality comprises means for monitoring battery power.

33. The computing device of claim 29, wherein means for pulling a subset of content data sufficient to provide the determined level of quality comprises means for pulling content data based on the determined resource availability.

34. The computing device of claim 33, wherein means for pulling content data based on the determined resource availability comprises:
    means for pulling data based on at least one of:
        instantaneous processor utilization;
        average processor utilization;
        remaining battery power of the computing device;
        instantaneous power consumption;
        average power consumption;
        idle processor cycles;
        available system memory; and
        available system memory bandwidth.

35. The computing device of claim 33, wherein means for pulling a subset of content data sufficient to provide the determined level of quality comprises means for declining to receive, in the means for receiving content, one or more of non-reference video frames and enhancement layer video frames in a video data stream.

36. The computing device of claim 33, further comprising:
    means for changing a decode frame rate by not decoding at least one received non-reference video frame.

37. The computing device of claim 33, wherein means for pulling a subset of content data sufficient to provide the determined level of quality comprises:
    means for declining to receive, in the means for receiving content, at least one or more of reference video frames and any non-reference video frames following the reference video frames in presentation order until the earliest scene change is detected to occur sooner than the threshold duration.

38. The computing device of claim 33, wherein further comprising:
    means for changing a render frame rate by not rendering at least one or more video frames after decoding.

39. The computing device of claim 33,
    wherein means for pulling a subset of content data sufficient to provide the determined level of quality comprises one of:
        means for simplifying or skipping deblocking of non-reference frames; and
        means for simplifying or skipping deblocking of reference frames when a full screen refresh is detected to occur sooner than the threshold duration, and
    wherein the computing device further comprises means for substituting a default higher complexity and higher performance spatial resizing algorithm used for display with a lower complexity algorithm.

40. The computing device of claim 33, wherein means for pulling a subset of content data sufficient to provide the determined level of quality comprises:
    means for powering off a radio module of the computing device during transmission of video frames not required such that these video frames are not received in the means for receiving content.

41. The computing device of claim 33, wherein means for determining an acceptable level of quality that balances resource availability and presentation quality comprises:
    means for collecting data; and
    means for reporting utilization and availability information.

42. The computing device of claim 33, further comprising:
    means for transitioning from a higher quality to a lower quality when resources are scarce; and
    means for transitioning from the lower quality back to the higher quality when resources are no longer scarce.

43. A non-transitory computer readable storage medium having stored thereon processor-executable software instructions configured to cause a processor to perform operations comprising:
    determining resource availability of a computing device;
    determining an acceptable level of quality that balances resource availability and presentation quality; and
    pulling from a receiver circuit a subset of content data, the subset being sufficient to provide the determined level of quality, wherein the subset of content data comprises received compressed video frames and pulling the subset of content data comprises not pulling at least one or more of reference video frames and any non-reference video frames following the reference video frames in presentation order until an earliest scene change instant when the earliest scene change instant is detected to occur sooner than a threshold duration.

44. The non-transitory computer readable storage medium of claim 43, wherein the stored processor-executable software instructions are configured to cause a processor to perform operations such that determining an acceptable level of quality that balances resource availability and presentation quality comprises communicating with an operating system through a programming interface.

45. The non-transitory computer readable storage medium of claim 43, wherein the stored processor-executable software instructions are configured to cause a processor to perform operations such that determining an acceptable level of quality that balances resource availability and presentation quality comprises determining an availability of a steady power source.

46. The non-transitory computer readable storage medium of claim 43, wherein the stored processor-executable software instructions are configured to cause a processor to perform operations such that determining an acceptable level of quality that balances resource availability and presentation quality comprises monitoring battery power.

47. The non-transitory computer readable storage medium of claim 43, wherein the stored processor-executable software instructions are configured to cause a processor to perform operations such that pulling from the receiver circuit a subset of content data sufficient to provide the determined level of quality comprises pulling content data based on the determined resource availability.

48. The non-transitory computer readable storage medium of claim 47, wherein the stored processor-executable software instructions are configured to cause a processor to perform operations such pulling content data based on the determined resource availability comprises pulling content data based on at least one of:
   instantaneous processor utilization;
   average processor utilization;
   remaining battery power;
   instantaneous power consumption;
   average power consumption;
   idle processor cycles;
   available system memory; and
   available system memory bandwidth.

49. The non-transitory computer readable storage medium of claim 47, wherein the stored processor-executable software instructions are configured to cause a processor to perform operations such that pulling from the receiver circuit a subset of content data sufficient to provide the determined level of quality comprises declining to receive one or more of non-reference video frames and enhancement layer video frames in a video data stream.

50. The non-transitory computer readable storage medium of claim 47, wherein the stored processor-executable software instructions are configured to cause a processor to perform operations comprising:
   changing a decode frame rate by not decoding at least one received non-reference video frame.

51. The non-transitory computer readable storage medium of claim 47, wherein the stored processor-executable software instructions are configured to cause a processor to perform operations such that pulling from the receiver circuit a subset of content data sufficient to provide the determined level of quality comprises declining to receive at least one or more of reference video frames and any non-reference video frames following the reference video frames in presentation order until the earliest scene change is detected to occur sooner than the threshold duration.

52. The non-transitory computer readable storage medium of claim 47, wherein the stored processor-executable software instructions are configured to cause a processor to perform operations comprising:
   changing a render frame rate by not rendering at least one or more video frames after decoding.

53. The non-transitory computer readable storage medium of claim 47,
   wherein the stored processor-executable software instructions are configured to cause a processor to perform operations such that pulling from the receiver circuit a subset of content data sufficient to provide the determined level of quality comprises one of:
      simplifying or skipping deblocking of non-reference frames; and
      simplifying or skipping deblocking of reference frames when a full screen refresh is detected to occur sooner than the threshold duration, and
   wherein the stored processor-executable software instructions are configured to cause a processor to perform operations comprising substituting a default higher complexity and higher performance spatial resizing algorithm used for display with a lower complexity algorithm.

54. The non-transitory computer readable storage medium of claim 47, wherein the stored processor-executable software instructions are configured to cause a processor to perform operations such that pulling a subset of content data sufficient to provide the determined level of quality comprises:
   powering off a radio module during transmission of video frames not required such that the receiver circuit does not receive these video frames.

55. The non-transitory computer readable storage medium of claim 47, wherein the stored processor-executable software instructions are configured to cause a processor to perform operations such that determining an acceptable level of quality that balances resource availability and presentation quality comprises collecting data and reporting utilization and availability information.

56. The non-transitory computer readable storage medium of claim 47, wherein the stored processor-executable software instructions are configured to cause a processor to perform operations comprising:
   transitioning from a higher quality to a lower quality when resources are scarce; and
   transitioning from the lower quality back to the higher quality when resources are no longer scarce.

57. A method of enhancing user experience and mobile device performance in a mobile device having an application layer component, the method comprising:
   determining mobile device resource availability in the application layer component;
   determining an acceptable level of quality that balances resource availability and presentation quality in the application layer component;
   receiving content in a dynamic adaptive video streaming session of the application layer component from a streaming server; and
   the application layer component pulling from the streaming server a subset of content data, the subset being sufficient to provide the determined level of quality, wherein the application layer does not pull at least one of a reference video frame and any non-reference video frames following the reference video frame in presentation order until an earliest scene change instant when the earliest scene change instant is detected to occur sooner than a threshold duration.

58. The method of claim 57, wherein determining an acceptable level of quality that balances resource availability and presentation quality in the application layer component comprises the application layer component communicating with an operating system of the mobile device through a programming interface.

59. The method of claim 57, wherein pulling content from the streaming server comprises pulling and receiving compressed video frames.

60. The method of claim 57, wherein determining an acceptable level of quality that balances resource availability and presentation quality in the application layer component comprises monitoring battery power.

61. The method of claim 57, wherein determining an acceptable level of quality that balances resource availability and presentation quality in the application layer component comprises determining whether the mobile device is connected to a steady power source.

62. The method of claim 57, wherein pulling from the streaming server a subset of content data sufficient to provide the determined level of quality comprises pulling content data based on the determined mobile device resource availability.

63. The method of claim 62, wherein pulling content data based on the determined mobile device resource availability comprises pulling content data based on at least one of:
  instantaneous processor utilization;
  average processor utilization;
  remaining battery power of the mobile device;
  instantaneous power consumption;
  average power consumption;
  idle processor cycles;
  available system memory; and
  available system memory bandwidth.

64. The method of claim 62, wherein pulling from the streaming server a subset of content data sufficient to provide the determined level of quality comprises pulling a set of compressed video frames having an altered level of quality in at least one of a frame rate, a frame spatial resolution, and a frame compression quality.

65. The method of claim 62, further comprising:
  changing a decode frame rate by not decoding at least one received non-reference video frame.

66. The method of claim 62, wherein pulling from the streaming server a subset of content data sufficient to provide the determined level of quality comprises not decoding at least one or more of reference video frames and any non-reference video frames following them in presentation order until the earliest scene change instant when the earliest scene change instant is detected to occur sooner than the threshold duration.

67. The method of claim 62, further comprising:
  changing a render frame rate by not rendering at least one or more video frames after decoding.

68. The method of claim 62,
  wherein pulling from the streaming server a subset of content data sufficient to provide the determined level of quality comprises one of:
    simplifying or skipping deblocking of non-reference frames; and
    simplifying or skipping deblocking of reference frames when a full screen refresh is detected to occur sooner than the threshold duration, and
  wherein the method further comprises substituting a default higher complexity and higher performance spatial resizing algorithm used for display with a lower complexity algorithm.

69. The method of claim 62, wherein pulling from the streaming server a subset of content data sufficient to provide the determined level of quality comprises collecting data and reporting utilization and availability information to one or more application layer components by a system wide resource monitoring agent.

70. The method of claim 62, further comprising:
  transitioning from a higher quality to a lower quality when resources are scarce; and
  transitioning from the lower quality back to the higher quality when resources are no longer scarce.

71. A computing device, comprising:
  means for determining computing device resource availability;
  means for determining an acceptable level of quality that balances resource availability and presentation quality;
  means for receiving in a dynamic adaptive video streaming session content from a streaming server; and
  means for pulling from the streaming server a subset of content data, the subset being sufficient to provide the determined level of quality, wherein the means for pulling from the streaming server the subset of content data comprises means for not pulling at least one of a reference video frame and any non-reference video frames following the reference video frame in presentation order until an earliest scene change instant when the earliest scene change instant is detected to occur sooner than a threshold duration.

72. The computing device of claim 71, wherein means for determining an acceptable level of quality that balances resource availability and presentation quality comprises means for communicating with an operating system of the computing device through a programming interface.

73. The computing device of claim 71, wherein means for receiving content from the streaming server comprises means for pulling and receiving compressed video frames.

74. The computing device of claim 71, wherein means for determining an acceptable level of quality that balances resource availability and presentation quality comprises means for monitoring battery power.

75. The computing device of claim 71, wherein means for determining an acceptable level of quality that balances resource availability and presentation quality comprises means for determining whether the computing device is connected to a steady power source.

76. The computing device of claim 71, wherein means for pulling from the streaming server a subset of content data sufficient to provide the determined level of quality comprises means for pulling content data based on the determined computing device resource availability.

77. The computing device of claim 76, wherein means for pulling content data based on the determined computing device resource availability comprises means for pulling content data based on at least one of:
  instantaneous processor utilization;
  average processor utilization;
  remaining battery power of the computing device;
  instantaneous power consumption;
  average power consumption;
  idle processor cycles;
  available system memory; and
  available system memory bandwidth.

78. The computing device of claim 76, wherein means for pulling from the streaming server a subset of content data sufficient to provide the determined level of quality comprises means for pulling a set of compressed video frames having an altered level of quality in at least one of a frame rate, a frame spatial resolution, and a frame compression quality.

79. The computing device of claim 76, further comprising:
means for changing a decode frame rate by not decoding at least one received non-reference video frame.

80. The computing device of claim 76, wherein means for pulling from the streaming server a subset of content data sufficient to provide the determined level of quality comprises means for not decoding at least one or more of reference video frames and any non-reference video frames following them in presentation order until the earliest scene change instant when the earliest scene change instant is detected to occur sooner than the threshold duration.

81. The computing device of claim 76, further comprising:
means for changing a render frame rate by not rendering at least one or more video frames after decoding.

82. The computing device of claim 76,
wherein means for pulling from the streaming server a subset of content data sufficient to provide the determined level of quality comprises one of:
means for simplifying or skipping deblocking of non-reference frames; and
means for simplifying or skipping deblocking of reference frames when a full screen refresh is detected to occur sooner than the threshold duration, and
wherein the computing device further comprises means for substituting a default higher complexity and higher performance spatial resizing algorithm used for display with a lower complexity algorithm.

83. The computing device of claim 76, wherein means for pulling from the streaming server a subset of content data sufficient to provide the determined level of quality comprises means for collecting data and reporting utilization and availability information to one or more application layer components by a system wide resource monitoring agent.

84. The computing device of claim 76, further comprising:
means for transitioning from a higher quality to a lower quality when resources are scarce; and
means for transitioning from the lower quality back to the higher quality when resources are no longer scarce.

85. A computing device, comprising:
a memory;
a network interface configured to communicate via a network with a streaming server; and
a processor coupled to the memory and the network interface, wherein the processor is configured with processor-executable instructions to perform operations comprising:
determining computing device resource availability;
determining an acceptable level of quality that balances resource availability and presentation quality;
receiving in a dynamic adaptive video streaming session content from the streaming server; and
pulling from the streaming server a subset of content data, the subset being sufficient to provide the determined level of quality, wherein pulling from the streaming server the subset of content data comprises not pulling at least one of a reference video frame and any non-reference video frames following the reference video frame in presentation order until an earliest scene change instant when the earliest scene change instant is detected to occur sooner than a threshold duration.

86. The computing device of claim 85, wherein the processor is configured with processor-executable instructions such that determining an acceptable level of quality that balances resource availability and presentation quality comprises communicating with an operating system of the computing device through a programming interface.

87. The computing device of claim 85, wherein the processor is configured with processor-executable instructions such that receiving content from the streaming server comprises pulling and receiving compressed video frames.

88. The computing device of claim 85, wherein the processor is configured with processor-executable instructions such that determining an acceptable level of quality that balances resource availability and presentation quality comprises monitoring battery power.

89. The computing device of claim 85, wherein the processor is configured with processor-executable instructions such that determining an acceptable level of quality that balances resource availability and presentation quality comprises determining whether the computing device is connected to a steady power source.

90. The computing device of claim 85, wherein the processor is configured with processor-executable instructions such that pulling from the streaming server a subset of content data sufficient to provide the determined level of quality comprises pulling content data based on the determined computing device resource availability.

91. The computing device of claim 90, wherein the processor is configured with processor-executable instructions such that pulling content data based on the determined computing device resource availability comprises pulling content data based on at least one of:
instantaneous processor utilization;
average processor utilization;
remaining battery power of the computing device;
instantaneous power consumption;
average power consumption;
idle processor cycles;
available system memory; and
available system memory bandwidth.

92. The computing device of claim 90, wherein the processor is configured with processor-executable instructions such that pulling from the streaming server a subset of content data sufficient to provide the determined level of quality comprises pulling a set of compressed video frames having an altered level of quality in at least one of a frame rate, a frame spatial resolution, and a frame compression quality.

93. The computing device of claim 90, wherein the processor is configured with processor-executable instructions to perform operations further comprising:
changing a decode frame rate by not decoding at least one received non-reference video frame.

94. The computing device of claim 90, wherein the processor is configured with processor-executable instructions such that pulling from the streaming server a subset of content data sufficient to provide the determined level of quality comprises not decoding at least one or more of reference video frames and any non-reference video frames following them in presentation order until the earliest scene change instant when the earliest scene change instant is detected to occur sooner than the threshold duration.

95. The computing device of claim 90, wherein the processor is configured with processor-executable instructions to perform operations further comprising:
changing a render frame rate by not rendering at least one or more video frames after decoding.

96. The computing device of claim 90,
wherein the processor is configured with processor-executable instructions such that pulling from the streaming server a subset of content data sufficient to provide the determined level of quality comprises one of:
simplifying or skipping deblocking of non-reference frames; and simplifying or skipping deblocking of reference frames when a full screen refresh is detected to occur sooner than the threshold duration, and wherein the processor is configured with processor-executable instructions to perform operations further comprising substituting a default higher complexity and higher performance spatial resizing algorithm used for display with a lower complexity algorithm.

97. The computing device of claim 90, wherein the processor is configured with processor-executable instructions such that pulling from the streaming server a subset of content data sufficient to provide the determined level of quality comprises collecting data and reporting utilization and availability information to one or more application layer components by a system wide resource monitoring agent.

98. The computing device of claim 90, wherein the processor is configured with processor-executable instructions to perform operations further comprising:

transitioning from a higher quality to a lower quality when resources are scarce; and transitioning from the lower quality back to the higher quality when resources are no longer scarce.

99. The computing device of claim 85, wherein the network interface comprises a transceiver circuit configured to communicate via a wireless network.

100. A non-transitory computer readable storage medium having stored thereon processor-executable software instructions configured to cause a processor to perform operations comprising:

determining computing device resource availability;

determining an acceptable level of quality that balances resource availability and presentation quality;

receiving in a dynamic adaptive video streaming session content from a streaming server; and pulling from the streaming server a subset of content data, the subset being sufficient to provide the determined level of quality, wherein pulling from the streaming server the subset of content data comprises not pulling at least one of a reference video frame and any non-reference video frames following the reference video frame in presentation order until an earliest scene change instant when the earliest scene change instant is detected to occur sooner than a threshold duration.

101. The non-transitory computer readable storage medium of claim 100, wherein the stored processor-executable software instructions are configured to cause a processor to perform operations such that determining an acceptable level of quality that balances resource availability and presentation quality comprises communicating with an operating system of a computing device through a programming interface.

102. The non-transitory computer readable storage medium of claim 100, wherein the stored processor-executable software instructions are configured to cause a processor to perform operations such that receiving content from the streaming server comprises pulling and receiving compressed video frames.

103. The non-transitory computer readable storage medium of claim 100, wherein the stored processor-executable software instructions are configured to cause a processor to perform operations such that determining an acceptable level of quality that balances resource availability and presentation quality comprises monitoring battery power.

104. The non-transitory computer readable storage medium of claim 100, wherein the stored processor-executable software instructions are configured to cause a processor to perform operations such that determining an acceptable level of quality that balances resource availability and presentation quality comprises determining whether a computing device is connected to a steady power source.

105. The non-transitory computer readable storage medium of claim 100, wherein the stored processor-executable software instructions are configured to cause a processor to perform operations such that pulling from the streaming server a subset of content data sufficient to provide the determined level of quality comprises pulling content data based on the determined computing device resource availability.

106. The non-transitory computer readable storage medium of claim 100, wherein the stored processor-executable software instructions are configured to cause a processor to perform operations such that pulling content data based on the determined computing device resource availability comprises pulling content data based on at least one of:

instantaneous processor utilization;

average processor utilization;

remaining battery power;

instantaneous power consumption;

average power consumption;

idle processor cycles;

available system memory; and available system memory bandwidth.

107. The non-transitory computer readable storage medium of claim 100, wherein the stored processor-executable software instructions are configured to cause a processor to perform operations such that pulling from the streaming server a subset of content data sufficient to provide the determined level of quality comprises pulling a set of compressed video frames having an altered level of quality in at least one of a frame rate, a frame spatial resolution, and a frame compression quality.

108. The non-transitory computer readable storage medium of claim 107, wherein the stored processor-executable software instructions are configured to cause a processor to perform operations comprising:

changing a decode frame rate by not decoding at least one received non-reference video frame.

109. The non-transitory computer readable storage medium of claim 107, wherein the stored processor-executable software instructions are configured to cause a processor to perform operations such that pulling from the streaming server a subset of content data sufficient to provide the determined level of quality comprises not decoding at least one or more of reference video frames and any non-reference video frames following them in presentation order until the earliest scene change instant when the earliest scene change instant is detected to occur sooner than the threshold duration.

110. The non-transitory computer readable storage medium of claim 107, wherein the stored processor-executable software instructions are configured to cause a processor to perform operations comprising:

changing a render frame rate by not rendering at least one or more video frames after decoding.

111. The non-transitory computer readable storage medium of claim 107, wherein the stored processor-executable software instructions are configured to cause a processor to perform operations such that pulling from the streaming server a subset of content data sufficient to provide the determined level of quality comprises one of:

simplifying or skipping deblocking of non-reference frames; and simplifying or skipping deblocking of reference frames when a full screen refresh is detected to occur sooner than the threshold duration, and wherein the stored processor-executable software instructions are configured to cause a processor to perform operations comprising substituting a default higher complexity and higher performance spatial resizing algorithm used for display with a lower complexity algorithm.

112. The non-transitory computer readable storage medium of claim 107, wherein the stored processor-executable software instructions are configured to cause a processor to perform operations such that pulling from the streaming server a subset of content data sufficient to provide the determined level of quality comprises collecting data and reporting utilization and availability information to one or more application layer components by a system wide resource monitoring agent.

113. The non-transitory computer readable storage medium of claim 107, wherein the stored processor-executable software instructions are configured to cause a processor to perform operations comprising:
- transitioning from a higher quality to a lower quality when resources are scarce; and
- transitioning from the lower quality back to the higher quality when resources are no longer scarce.

* * * * *